United States Patent
Komada et al.

[11] Patent Number: 5,885,378
[45] Date of Patent: Mar. 23, 1999

[54] HYDROGEN OCCLUDING ALLOY AND ELECTRODE MADE OF THE ALLOY

[75] Inventors: Norikazu Komada; Mitsugu Matsumoto; Shinichiro Kakehashi; Yoshitaka Tamo, all of Omiya, Japan

[73] Assignee: Mitsubishi Materials Corporation, Tokyo, Japan

[21] Appl. No.: 678,048

[22] Filed: Jul. 10, 1996

[30] Foreign Application Priority Data

| Jul. 12, 1995 | [JP] | Japan | 7-199179 |
| Jul. 17, 1995 | [JP] | Japan | 7-202834 |
| Jul. 17, 1995 | [JP] | Japan | 7-202835 |
| Oct. 25, 1995 | [JP] | Japan | 7-277545 |
| Oct. 25, 1995 | [JP] | Japan | 7-277546 |
| Oct. 25, 1995 | [JP] | Japan | 7-277547 |
| Apr. 25, 1996 | [JP] | Japan | 8-105089 |
| Apr. 25, 1996 | [JP] | Japan | 8-105090 |
| Apr. 25, 1996 | [JP] | Japan | 8-105091 |
| Apr. 25, 1996 | [JP] | Japan | 8-105093 |
| Apr. 25, 1996 | [JP] | Japan | 8-105094 |
| Apr. 25, 1996 | [JP] | Japan | 8-105095 |

[51] Int. Cl.$^6$ ............... C01B 6/24; C22C 30/00
[52] U.S. Cl. ............ 148/442; 420/900; 429/59; 429/101; 204/293
[58] Field of Search ............... 148/707, 708, 148/709, 710, 247, 711, 442; 420/900, 455, 580; 423/644; 428/472, 472.1

[56] References Cited

U.S. PATENT DOCUMENTS

| 4,728,586 | 3/1988 | Venkatesan et al. | 429/94 |
| 4,849,205 | 7/1989 | Hong | 423/644 |
| 4,898,794 | 2/1990 | Doi et al. | 429/59 |
| 4,983,474 | 1/1991 | Doi et al. | 429/59 |
| 5,043,233 | 8/1991 | Kameoka et al. | 429/59 |
| 5,277,998 | 1/1994 | Furukawa et al. | 429/59 |

FOREIGN PATENT DOCUMENTS

| 0 503 686 A2 | 9/1992 | European Pat. Off. |
| 0 552 790 A1 | 7/1993 | European Pat. Off. |
| 0 588 310 A2 | 3/1994 | European Pat. Off. |
| 0 588 310 A3 | 3/1994 | European Pat. Off. |
| 0 609 609 A2 | 8/1994 | European Pat. Off. |
| 60-241652 | 11/1985 | Japan |
| 4-168239 | 6/1992 | Japan |
| 4-328256 | 11/1992 | Japan |
| 5-217578 | 8/1993 | Japan |
| 5-247568 | 8/1993 | Japan |
| 5-287422 | 11/1993 | Japan |
| 6-283169 | 7/1994 | Japan |
| 6-187983 | 8/1994 | Japan |

OTHER PUBLICATIONS

Journal of Alloys and Compounds, 224 (Jun. 1995) 121–126, "Hydrogen Absorbing–Desorbing Properties and Crystal Structure of the Zr–Ti–Ni–Mn–V $AB_2$ Laves Phase Alloys", M. Yoshida.

(List continued on next page.)

*Primary Examiner*—Margery Phipps
*Attorney, Agent, or Firm*—Nikaido, Marmelstein, Murray & Oram LLP

[57] ABSTRACT

This invention provides a hydrogen occluding alloy having a composition comprising, by wt %, 25% to 45% of Zr, 1% to 12% of Ti, 10% to 20% of Mn, 2% to 12% of V, 0.5% to 5% of at least one rare earth element, optionally 0.1% to 4% of Hf, one or more selected from hydrogen, hydrogen+ oxygen, and oxygen, and a balance being Ni (25% or more of Ni) and unavoidable impurities, having a structure comprising: a phase made of a hydrogenated-product, dispersedly distributed in a matrix phase made of a Zr—Ni—Mn based alloy. The hydrogenated-product mainly comprises a rare earth element-Ni type alloy and a rare earth element hydride with numerous cracks formed at the time when the hydrogenated-product phase is generated. The hydrogenated-product phase is formed by exposing a hydrogen-containing substance on the surfaces of the cracks. Electrodes made of the alloy are disclosed.

25 Claims, 8 Drawing Sheets

OTHER PUBLICATIONS

Journal of Alloys and Compounds 231 (Dec. 1995) 392–396, "Surface and Metallographic Microstructure of the La–added Ab$_2$ compound (Ti,Zr) (Mn, Cr, Ni)$_2$", F.–J. Liu and Sandrock, S. Suda.

"Effects of partial substitution and anodic oxidation treatment of Zr–V–Ni alloys on electrochemical properties", Journal of the Less–Common Metals, 172–174 (1991) 1219–1226, S. Wakao and H. Sawa.

"Effects of pretreatment on the activation behavior of Zr(V$_{0.25}$Ni$_{0.75}$)$_2$ metal hydride electrodes in alkaline solution", Journal of Alloys and Compounds, 209 (1994) 99–150, Zuttel, et al.

"Hydrogen absorption alloys for Nickel–Hydrogen rechargeable batteries", Advanced Material '93, V/A: Ecomaterials, pp. 1994, 555–559, Matsumoto et al.

"F–treatment effect on the hydriding properties of La–substituted AB$_2$ compound (Ti,Zr)(Mn,Cr,Ni)$_2$", Int'l. Symposium on Metal–Hydrogen Systems Fundametals & Applns., Nov. 6–11, 1994, F.–J.Liu and S.Suda.

"Surface and metallographic microstructure of La–substituted AB$_2$ compound (Ti,Zr)(Mn,Cr,Ni)$_2$", Intl. Symposium on Metal–Hydrogen Systems Fundamentals & Applns., Nov. 6–11, 1994, F.–J. Liu, G.Sandrock and S.Suda.

"Activation behaviour of ZrCrNiM$_{0.05}$ metal hydride electrodes (M=La, Mm (misch metal), Nd)", Journal of Alloys and Compounds, 185, (1992) Soo–Ryoung Kim and Jai–Young Lee, pp. L1–L4.

"Hydrogen Absorption and Electrode Characteristics of (Ti, Zr)–(Ni,V,X)2+$\alpha$ Alloys", Zeitschrift fur Physikalische Chemie, B. 183, S.347–353 (1994), Miyamura et al.

"Hydrogen absorption–desorption characteristics of Ti0.35Zr0.65NixV2–x–yMny alloys with C14 Laves phase for nickel/metal hydride batteries", Journal of Alloys and Compounds, 227 (1995) 69–75, Yang et al.

HYDROGEN OCCLUDING ALLOY AND ELECTRODE MADE OF THE ALLOY

FIELD OF THE INVENTION

The present invention relates to a hydrogen occluding alloy exhibiting significant high hydrogen absorption and desorption rates and excellent initial activation during practical use, for example, as electrodes of batteries.

BACKGROUND OF THE INVENTION

Hitherto, a variety of hydrogen occluding alloys have been suggested, as exemplified by a hydrogen occluding alloy disclosed recently in "INTERNATIONAL SYMPOSIUM REGARDING THE FOUNDATION AND APPLICATION OF METAL-HYDROGEN SYSTEMS", held on Nov. 6 to 11, 1994, in Fujiyoshida, Japan.

The foregoing hydrogen occluding alloy is a Ni—Zr type alloy having a composition according to the formula:

$Ti_{0.5-x/2}Zr_{0.5-x/2}La_xMn_{0.8}Cr_{0.8}Ni_{0.4}$, in which x=0.0–0.1. Such alloys have a two-phase structure comprising a main phase made of a Zr—Ni—Mn based alloy and a phase made of a La—Ni type alloy which is dispersively distributed along the grain boundary of the main phase, as illustrated in an enlarged schematic view of the structure in FIG. 13.

In the foregoing conventional hydrogen occluding alloy, the phase made of the La—Ni type alloy dissociates atmospheric hydrogen molecules ($H_2$) to form hydrogen atoms (H) by its catalytic action, and absorbs the dissociated hydrogen atoms at a rate higher than that of the main phase made of the Zx—Ni—Mn type alloy; thus the absorption of the hydrogen atoms in the main phase made of the Zr—Ni—Mn type alloy is carried out mainly through the phase made of the La—Ni type alloy; and the hydrogen desorption is carried out by a function contrary to the foregoing function.

In addition, the foregoing conventional hydrogen occluding alloy can be made by preparing a Ni—Zr based liquid alloy having the foregoing composition, casting it into an ingot, and annealing the ingot for homogenization at a predetermined temperature within the range from 950° to 1,050° C. for a predetermined time in a non-oxidizing atmosphere, such as vacuum or inert gas.

In general, when the hydrogen occluding alloy is applied to an electrode of a battery, the battery can serve a practical use after an initial activation treatment in which charge/discharge cycles are repeated until the electrode including the hydrogen occluding alloy has a sufficient discharge capacity, in other words, until the discharge capacity caused by the hydrogen occluding alloy reaches near its maximum.

OBJECTS OF THE INVENTION

Meanwhile, there recently has been a great demand for large output, good performance, and energy saving with respect to batteries and heat pumps to which the hydrogen occluding alloy is widely applied. Therefore, there is a need for a hydrogen occluding alloy which has higher hydrogen absorption/desorption rates and a shorter initial-activation time as compared with conventional hydrogen occluding alloys.

SUMMARY OF THE INVENTION

In the above viewpoint, the inventors of the present invention hereby provide hydrogen occluding alloys having improved hydrogen absorption/desorption rates and initial activation according to the following descriptions (a1, a2, a3) and (b1, b2, b3):

(a1) A hydrogen occluding alloy comprising (all percentages herein, unless specified otherwise, are weight percentages):
  25% to 45% of Zr, 1% to 12% of Ti,
  10% to 20% of Mn, 2% to 12% of V,
  0.5 to 5% of at least one rare earth element, preferably comprising La and/or Ce, preferably consisting of 50% or more of La and/or Ce, and more preferably, consisting essentially of La and/or Ce,
  optionally 0.1% to 4% of Hf,
preferably,
  25% to 40% of Zr, 4% to 12% of Ti,
  10% to 20% of Mn, 2% to 8% of V,
  0.5% to 5% of La and/or Ce,
  optionally 0.1% to 2% of Hf,
more preferably,
  30% to 37% of Zr, 5% to 10% of Ti,
  14% to 18% of Mn, 3% to 6% of V,
  2% to 4% of La and/or Ce,
  optionally 1% to 1.7% of Hf,
and the balance being Ni (25% or more of Ni) and unavoidable impurities is obtained by mixing and melting Ni, Zr, Ti, Mn, V and rare earth (and optionally Hf) and casting to obtain ingots. By a subsequent homogenizing heat treatment at a temperature within the range of from 900° C. to 1100° C., for a period of not less than 1 hour, the ingots are provided with a structure including a dispersed phase made of a rare earth element-Ni type alloy existing along the grain boundary of the matrix phase made of a Zr—Ni—Mn based alloy. Further, following the foregoing homogenizing heat treatment, hydrogenation is carried out by heating in a hydrogen atmosphere in the range of from 400° C. to 900° C. for a period of not less than 30 minutes in a pressurized hydrogen atmosphere in the range of from 1 to 11 atm., followed by cooling. The cooling step should be conducted quickly enough that the ingot reaches a temperature of 200° C. or less within 10 hours (quenching can be used). As a result, the dispersed phase made of a rare earth element-Ni type alloy preferentially reacts with the atmospheric hydrogen and changes to a phase made of a hydrogenated-product mainly comprising a hydride of a rare earth element (hereinafter referred to as a rare earth element hydride) and a rare earth element-Ni type alloy, as illustrated in an enlarged schematic view of the structure shown in FIG. 1, 3. Since the phase made of a hydrogenated-product 13 exhibits larger thermal expansion as compared with the matrix phase 11 made of the Zx—Ni—Mn based alloy, numerous cracks 12 starting from the phase made of a hydrogenated-product are formed in the matrix phase such that the phase made of a hydrogenated-product is exposed on the surfaces of the cracks.

(a2) A hydrogen occluding alloy comprising
  25% to 45% of Zr, 1% to 12% of Ti,
  10% to 20% of Mn, 2% to 12% of V,
  0.5 to 5% of at least one rare earth element, preferably comprising La and/or Ce, preferably consisting of 50% or more of La and/or Ce, and more preferably, consisting essentially of La and/or Ce,
  optionally 0.1% to 4% of Hf,
preferably,
  25% to 40% of Zr, 4% to 12% of Ti,
  10% to 20% of Mn, 2% to 8% of V,
  0.5% to 5% of La and/or Ce,
  optionally 0.1% to 2% of Hf,
more preferably, 30% to 37% of Zr, 5% to 10% of Ti,
14% to 18% of Mn, 3% to 6% of V,
2% to 4% of La and/or Ce,
optionally 1% to 1.7% of Hf,
the balance being Ni (25% or more of Ni) and unavoidable impurities is obtained by mixing and melting Ni, Zr, Ti, Mn, V and rare earth (and optionally Hf) and casting to obtain ingots. By a subsequent homogenizing heat treatment under the same conditions as the (a1), the alloy ingots are provided with a structure including a dispersed phase made of a rare earth element-Ni type alloy existing along the grain boundary of the matrix phase made of a Zx—Ni—Mn based alloy. Further, following the foregoing homogenizing heat treatment, hydrogenation is carried out by heating in a hydrogen atmosphere in the range of from 400° C. to 900° C. for a period of not less than 30 minutes, in a pressurized hydrogen atmosphere in the range of from 1 to 11 atm., followed by cooling. The cooling step should be conducted quickly enough that the ingot reaches a temperature of 200° C. or less within 10 hours (as mentioned above, quenching can be used). As a result, the dispersed phase made of a rare earth element-Ni type alloy preferentially reacts with the atmospheric hydrogen and changes to a phase made of a hydrogenated-product mainly comprising a hydride of a rare earth element (hereinafter referred to as a rare earth element hydride) and a rare earth element-Ni type alloy, as illustrated in an enlarged schematic view of the structure shown in FIG. 1, 3. Since the phase made of a hydrogenated-product exhibits larger thermal expansion as compared with the matrix phase made of the Zr—Ni—Mn based alloy, numerous cracks starting from the phase made of a hydrogenated-product are formed in the matrix phase such that the phase made of a hydrogenated-product is exposed on the surfaces of the cracks. By a succeeding oxidation treatment of, for example, immersing in an alkaline aqueous solution, such as KOH or NaOH aqueous solution, for a period of time in the range of from 1 minute to 1 hour, the foregoing rare earth element hydride changes to a rare earth element hydroxide. As a result, the Ni—Zr—Mn based alloy exhibits a structure comprising a hydrogenated-product phase 15 comprising rare earth element-Ni type alloy and rare earth element hydroxide, dispersedly distributed in a matrix phase 11 made of a Zx—Ni—Mn based alloy, and mainly comprising a rare earth element hydroxide and a rare earth element-Ni type alloy; and numerous cracks 12, wherein the hydrogenated-product phase is exposed on the surfaces of the cracks, as illustrated in an enlarged schematic view of the typical structure shown in FIG. 5, 7.

(a3) A hydrogen occluding alloy comprising (all percentages herein, unless specified otherwise, are weight percentages):
25% to 45% of Zr, 1% to 12% of Ti,
10% to 20% of Mn, 2% to 12% of V,
0.5 to 5% of at least one rare earth element, preferably comprising La and/or Ce, preferably consisting of 50% or more of La and/or Ce, and more preferably, consisting essentially of La and/or Ce,
optionally 0.1% to 4% of Hf,
preferably,
25% to 40% of Zr, 4% to 12% of Ti,
10% to 20% of Mn, 2% to 8% of V,
0.5% to 5% of La and/or Ce,
optionally 0.1% to 2% of Hf,
more preferably,
30% to 37% of Zr, 5%to 10% of Ti,
14% to 18% of Mn, 3% to 6% of V,
2% to 4% of La and/or Ce,
optionally 1% to 1.7% of Hf,
at least 25% of Ni, and the balance being unavoidable impurities; and homogenizing the Ni-based alloy ingot under the same conditions as in (a1) and (a2), this alloy has a structure in which a dispersion phase made of a rare earth element-Ni type alloy is distributed along the grain boundary of a matrix phase made of the Zr—Ni—Mn based alloy, as in (a1) and (a2). In addition, by hydrogenation of the ingot after the homogenization at a predetermined temperature within the range from 400° to 900° C. for a period of not less than 30 minutes in a pressurized hydrogen atmosphere in the range of from 1 to 11 atm., followed by cooling (the cooling step should be conducted quickly enough that the ingot reaches a temperature of 200° C. or less within 10 hours) the dispersion phase made of the rare earth element-Ni type alloy predominantly reacts with the atmospheric hydrogen to obtain a hydrogenated-product phase mainly including rare earth element hydride and rare earth element-Ni type alloy. Since the hydrogenated-product phase shows a greater thermal expansion compared with the matrix phase made of the Zx—Ni—Mn based alloy, numerous cracks which start from the hydrogenated-product phase form in the matrix phase such that the hydrogenated-product phase is exposed on the face of the cracks. Moreover, by oxidizing the alloy in an oxidizing atmosphere (e.g., a suitable oxidizing atmosphere is air at a pressure of about 1 atm.) at a temperature ranging from 400° to 500° C., rare earth element hydride is oxidized to rare earth element oxide. As a result, the Ni based alloy has a structure in which a hydrogenated-product phase 16 comprising rare earth element-Ni type alloy and rare earth element oxide is dispersively distributed in the matrix phase 11 made of the Zr—Ni—Mn based alloy, the hydrogenated-product phase mainly comprises the rare earth element-Ni type alloy and the rare earth element oxide, numerous cracks 12 exist, and the hydrogenated-product phase is exposed on the surface of the cracks, as shown in an enlarged schematic view of the structure in FIG. 9, 11.

(b1) The Ni—Zr—Mn based alloy described in (a1) comprises a phase made of a hydrogenated-product including a rare earth element-Ni type alloy and rare earth element hydride. The rare earth element-Ni type alloy dissociates the hydrogen atoms (H) from the atmospheric hydrogen molecules ($H_2$) by the catalytic function thereof and absorbs the dissociated hydrogen atoms at a higher rate as compared with the matrix phase made of the Zx—Ni—Mn based alloy. Hydrogen desorption proceeds according to a function contrary to the foregoing function. The effective area of the foregoing Ni—Zr—Mn based alloy increases because most of the phase made of a hydrogenated-product is exposed on the surface of the numerous cracks. Together with the effect of the rare earth element hydride which enhances the diffusion of the absorbed hydrogen atoms and desorbed hydrogen atoms, absorption and desorption of the hydrogen atoms proceed at a higher rate as compared with the conventional hydrogen occluding alloy. Moreover, the hydrogen-atom absorption ratio of the foregoing matrix phase at the initial activation increases on a large scale because the absorption proceeds through a larger effective area, thus significantly promoting the initial activation.

(b2) The Ni—Zr—Mn based alloy described in (a2) comprises a hydrogenated-product phase comprising rare earth element-Ni type alloy and rare earth element hydroxide. A rare earth element-Ni type alloy and a rare earth element hydroxide constitute the hydrogenated-product phase and dissociate the hydrogen atoms (H) from the atmospheric hydrogen molecules ($H_2$) by the catalytic function thereof and absorb the dissociated hydrogen atoms at a higher rate as compared with the matrix phase made of the Zr—Ni—Mn based alloy. Hydrogen desorption proceeds according to a function contrary to the foregoing function. The effective area of the foregoing Ni—Zr—Mn based alloy increases because most of the hydrogenated-product phase is exposed on the surface of the numerous cracks. Thus, absorption and desorption of the hydrogen atoms proceed at a higher rate as compared with the conventional hydrogen occluding alloy. Moreover, the hydrogen-atom absorption ratio of the foregoing matrix phase at the initial activation increases on a large scale because the absorption proceeds through a larger effective area, thereby significantly promoting the initial activation.

(b3) In the Ni—Zr—Mn based alloy described in (a3), the rare earth element-Ni type alloy and the rare earth element oxide in the hydrogenated-product phase, as one component, catalytically dissociates atmospheric hydrogen molecules ($H_2$) to form hydrogen atoms (H), and absorbs the dissociated hydrogen atoms at a higher rate as compared with the matrix phase made of the Zx—Ni—Mn based alloy. The desorption is carried out by the function contrary to the foregoing function. Since much of the hydrogenated-product phase is exposed on the surface of the numerous cracks, the effective area significantly increases. Thus, the hydrogen absorption and desorption can be carried out at rates higher than those of the conventional hydrogen occluding alloy. Further, initial activation is significantly promoted because the absorption of hydrogen atoms at the initial activation is carried out through a large effective area of the matrix phase.

In accordance with the present invention as described in a1, a2, a3, b1, b2 and b3 above, the hydrogenation step can be conducted immediately after the homogenization step, with or without cooling. Alternatively, the hydrogenation step can be conducted any time after the homogenization step, i.e., with a time period between the two steps. For example, if desired, the ingot can be cooled e.g., to room temperature between the two steps, or the ingot can be transferred directly from the homogenization step to the hydrogenation step without cooling.

As used herein, as discussed above with respect to a1, a2, a3, b1, b2 and b3, the expression "hydrogenated-product" refers to the portion of the rare earth-Ni phase which was hydrogenated to produce rare earth element hydride, and which, optionally, at least some of which was later further converted to rare earth element hydroxide or to rare earth element oxide.

As mentioned above, the matrix phase of the alloys in accordance with the present invention as described above in a1, a2, a3, b1, b2 and b3 have numerous cracks. These cracks are generally of varying size, and the matrix phase has at least about 100 cracks having a major dimension which exceeds 0.1 micrometers per square millimeter.

The present invention was achieved based on the result of the foregoing study, and is characterized by a hydrogen occluding alloy exhibiting high hydrogen absorption and desorption rates and excellent initial activation. The hydrogen occluding alloy has a composition comprising:

25% to 45% of Zr, 1% to 12% of TI,
10% to 20% of Mn, 2% to 12% of V,
0.5% to 5% of at least one rare earth element, preferably comprising La and/or Ce,
optionally 0.1% to 4% of Hf, 0.01% to 0.2% of hydrogen, preferably
25% to 40% of Zr, 4% to 12% of Ti,
10% to 20% of Mn, 2% to 8% of V,
0.5% to 5% of La and/or Ce,
optionally 0.1% to 2% of Hf, 0.04% to 0.12% of hydrogen and more preferably
30% to 37% of Zr, 5% to 10% of Ti,
14% to 18% of Mn, 3% to 6% of V,
2% to 4% of La and/or Ce,
optionally 1% to 1.7% of Hf, 0.04% to 0.12% of hydrogen, and the balance being Ni (25% or more of Ni) and unavoidable impurities;

and has a structure comprising:
a phase made of a hydrogenated-product, dispersedly distributed in a matrix phase made of a Zx—Ni—Mn based alloy, and mainly comprising a rare earth element hydride and a rare earth element-Ni type alloy;
numerous cracks formed at the time when the phase made of a hydrogenated-product is generated, and
the phase made of a hydrogenated-product being exposed on the surfaces of the cracks.

The present invention was achieved based on the result of the foregoing study, and, in a second aspect, is characterized by a hydrogen occluding alloy exhibiting high hydrogen absorption/desorption rates and excellent initial activation. The hydrogen occluding alloy has a composition comprising:

25% to 45% of Zr, 1% to 12% of Ti,
10% to 20% of Mn, 2% to 12% of V,
0.5% to 5% of at least one rare earth element, preferably comprising La and/or Ce,
optionally 0.1% to 4% of Hf,
0.015% to 0.3% of hydrogen, 0.3% to 3.2% of oxygen, preferably,
25% to 40% of Zr, 4% to 12% of Ti,
10% to 20% of Mn, 2% to 8% of V,
0.5% to 5% of La and/or Ce,
optionally 0.1% to 2% of Hf,
0.05% to 0.15% of hydrogen, 0.6% to 1.7% of oxygen and more preferably
30% to 37% of Zr, 5% to 10% of Ti,
14% to 18% of Mn, 3% to 6% of V,
2% to 4% of La and/or Ce,
optionally 0.1% to 4% of Hf,
0.05% to 0.15% of hydrogen, 0.6% to 1.7% of oxygen and the balance being Ni (25% or more of Ni) and unavoidable impurities;

and has a structure comprising:
a hydrogenated-product phase, being dispersedly distributed in a matrix phase made of a Zx—Ni—Mn based alloy, and mainly comprising a rare earth element hydroxide and a rare earth element-Ni type alloy;
numerous cracks formed during the hydrogenation treatment, and the hydrogenated-product phase being exposed on the surfaces of the cracks.

The present invention was achieved based on the results set forth above, and, in a third aspect, is characterized by a hydrogen occluding alloy comprising:
25% to 45% of Zr, 1% to 12% of Ti,
10% to 20% of Mn, 2% to 12% of V,
0.5% to 5% of at least one rare earth element, preferably comprising La and/or Ce,
optionally 0.1% to 4% of Hf,
0.2% to 1.7% of oxygen, preferably 25% to 40% of Zr, 4% to 12% of Ti, 10% to 20% of Mn, 2% to 8% of V, 0.5% to 5% of La and/or Ce, optionally 0.1% to 2% of Hf, 0.4% to 1.0% of oxygen and more preferably 30% to 37% of Zr, 5% to 10% of Ti, 14% to 18% of Mn, 3% to 6% of V, 2% to 4% of La and/or Ce, optionally 0.1% to 4% of Hf, 0.4% to 1.0% of oxygen, at least 25% of Ni, and the balance being unavoidable impurities;

and has an alloy structure, wherein a hydrogenated-product phase is dispersively distributed in a matrix phase made of Zr—Ni—Mn based alloy, and the hydrogenated-product phase mainly comprises rare earth element oxide and rare earth element-Ni type alloy, numerous cracks having been produced during forming the hydrogenated-product phase, and the hydrogenated-product phase being exposed on the faces of the cracks.

The "Ni—Zr type alloy" is referred to herein as such because it may include small amounts of materials other than Ni and Zr, e.g., a suitable Ni—Zr type alloy may consist of 41.4–41.9% Zr, 48.8–50.4% Ni, and about 8% other ingredients. It is believed, based on electron-probe microanalysis, that the phase is essentially a Ni—Zr binary alloy or intermetallics phase.

"Zr—Ni—Mn based alloy" (or "Zx—Ni—Mn type alloy") refers to an alloy whose approximate formula is (Zr, Ti)(Ni, Mn, V)$_2$.

The reason the composition of the hydrogen occluding alloy according to the present invention is limited to the foregoing ranges will now be described.

(a) Zr

The Zr component has, as described above, the function of forming the matrix phase in association with Ni and Mn to increase the amount of the occluded hydrogen. When the Zr content is less than 25%, the desired amount of hydrogen cannot be occluded. Whereas, if the content exceeds 45%, the amount of hydrogen occluded by the overall alloy decreases. Therefore, the Zr content is determined to be 25% to 45%, preferably 25% to 40% and more preferably 30% to 37.

(b) Ti

The Ti component has a function of rendering the equilibrium pressure for dissociating hydrogen of the alloy to, for example, a level lower than the atmospheric pressure at room temperature so as to enhance the hydrogen absorption/desorption. Furthermore, the Ti component in the matrix phase increases the amount of occluded hydrogen. If the Ti content is less than 1%, the desired effect as set forth above cannot be achieved. Meanwhile when the content exceeds 12%, the equilibrium pressure for dissociating hydrogen is again raised to, for example, a level higher than the atmospheric pressure at room temperature. As a result, the hydrogen absorption/desorption decreases. Therefore, the Ti content is determined to be 1% to 12%, and preferably 4% to 12% and more preferably 5% to 10%.

(c) Mn

The Mn component has a function of mainly forming the matrix phase so as to increase the quantity of occluded hydrogen. When the Mn content is less than 10%, the desired effect cannot be obtained from the foregoing function. Meanwhile, an Mn content over 20% suppresses the hydrogen absorption/desorption capability. Therefore, the content is determined to be 10% to 20%, and preferably, 14% to 18%.

(d) V

The V component has a function of stabilizing the equilibrium pressure for dissociating hydrogen of the alloy and increasing the quantity of occluded hydrogen. If the V content is less than 2%, the desired effect set forth above cannot be achieved. Whereas if the content exceeds 12%, the equilibrium pressure for dissociating hydrogen is lowered excessively, thus causing difficulty in desorbing the occluded hydrogen. As a result, a decrease in the quantity of the occluded hydrogen cannot be prevented. Therefore, the content is determined to be 2% to 12%, and preferably 2% to 8% and more preferably 3% to 6%.

(e) Rare earth element(s)

This component is essential to form the rare earth element-Ni type alloy, which dissociates and absorbs the atmospheric hydrogen at a higher rate as compared with the matrix phase while recombining and desorbing hydrogen to the atmosphere, as described above, and to form the rare earth element hydride which enhances the diffusion of the absorbed hydrogen to the matrix phase and that of the desorbed hydrogen from the matrix phase. If the content is less than 0.5%, the production ratio of the rare earth element-Ni type alloy and the rare earth element hydride becomes too low to maintain the desired high hydrogen-absorption/desorption rates. Meanwhile, if the content exceeds 5%, the production ratio of the dispersed phase, that does not significantly occlude hydrogen, increases excessively, and the quantity of hydrogen that can be occluded in the overall alloy is reduced unsatisfactorily. Therefore, the content is determined to be 0.5% to 5% and preferably 2% to 4%.

In addition, to satisfactorily obtain the above function due to the rare earth element-Ni type alloy and the rare earth element hydride, it is preferred that the rare earth element comprise La and/or Ce, preferably consists of 50% or more of La and/or Ce, and more preferably, consists essentially of La and/or Ce.

(f) Hf

Together with the Zr content, the Hf content (Hf is optional), when present, forms the matrix phase made of a Zx—Ni—Mn based alloy so as to allow the Zr content to satisfactorily exhibit the above function. When the Hf content is less than 0.1%, the desired effect cannot be obtained, whereas if the content exceeds 4%, the above function of the Zr content is impaired. Therefore, when Hf is present, the content is determined to be 0.1% to 4%, preferably 0.1% to 2% and more preferably 1% to 1.7%.

(g) Hydrogen (when the dispersed phase comprises hydride of rare earth element and rare earth-Ni type alloy):

Hydrogen forms the rare earth element hydride which is a main component of the phase made of a hydrogenated-product. Hydrogen is dissociated and absorbed by the rare earth element-Ni type alloy, which is also a component of the hydrogenated-product, and thereby transferred into the matrix phase at a high diffusion rate while the desorbed hydrogen from the matrix phase is diffused to the rare earth element-Ni type alloy. If the hydrogen content is less than 0.01%, the ratio of the rare earth element hydride which exhibits the foregoing function decreases excessively, thus the desired effect cannot be obtained. Meanwhile, when the content exceeds 0.2%, the ratio of the rare earth element hydride increases excessively as compared with that of the rare earth element-Ni type alloy, and the quantity of the rare earth element-Ni type alloy is reduced relatively, resulting in a decrease in the hydrogen absorption/desorption rates and the initial activation. Therefore, the content is determined to be 0.01% to 0.2%, and preferably, 0.04% to 0.12%.

(h) Hydrogen and oxygen (when the dispersed phase comprises hydroxide of rare earth element and rare earth-Ni type alloy):

These components are essential to form the rare earth element hydroxide. Together with the rare earth- element-Ni type alloy mainly composing the hydrogenated-product phase, the rare earth element hydroxide dissociates the hydrogen atoms (H) from the atmospheric hydrogen molecules ($H_2$), absorbs them at a higher rate as compared with the matrix phase, and diffuses them to the matrix phase, and, during desorption, rapidly desorbing the diffused hydrogen atoms from the matrix phase by recombining them to form hydrogen molecules. If the hydrogen content is less than 0.015% and the oxygen content is less than 0.3%, the production ratio of the rare earth element hydroxide decreases excessively, thus the foregoing functional effect cannot be obtained satisfactorily. Whereas, if the hydrogen contents exceeds 0.3% and the oxygen content exceeds 3.2%, the production ratio of the rare earth element hydroxide increases relatively, resulting in a decrease in strength. Further, the alloy is easily rendered into a fine powder. Therefore, the contents are determined to be 0.015% to 0.3% for hydrogen and 0.3% to 3.2% for oxygen, and preferably, 0.05% to 0.15% for hydrogen and 0.6% to 1.7% for oxygen.

(i) oxygen (when the dispersed phase comprises oxide of rare earth element and rare earth-Ni type alloy):

oxygen, as well as the intermetallic compound made of the rare earth element-Ni type alloy, is an essential component for forming the rare earth element oxide which dissociates atmospheric hydrogen molecules ($H_2$) to hydrogen atoms (H), absorbs the hydrogen atoms, diffuses the absorbed hydrogen atoms at rates higher than those in the matrix phase, and recombines immediately hydrogen atoms diffused from the matrix phase to form hydrogen molecules. When the oxygen content is less than 0.2%, such effects cannot be satisfactorily achieved and cracks insufficiently form, because the amount of the rare earth element oxide formed is too small. On the other hand, when the content exceeds 1.7%, the rare earth element oxide content is relatively excessive, so the strength decreases and the powder is readily fined. Therefore, the oxygen content is determined to be 0.2 to 1.7%, and preferably 0.4 to 1.0%.

(j) Ni

If the Ni content is less than 25%, the desired hydrogenabsorption/desorption rates and initial activation cannot be obtained, in particular, because of the insufficient production of the rare earth element-Ni type alloy composing the phase made of a hydrogenated-product. Therefore, the content is determined to be 25% or more.

In addition, the hydrogen occluding alloy according to the present invention can be rendered into a predetermined grain size by ordinary mechanical pulverization. Further, the alloy can be also pulverized by hydrogenation process consisting of hydrogen absorption by heating to a predetermined temperature ranging from 10° C. to 200° C. in a pressurized hydrogen atmosphere and hydrogen desorption by evacuation. The powder 14 obtained by either way exhibits the structure illustrated in the enlarged schematic view of FIGS. 2 and 4 (1a), FIGS. 6 and 8 (1b), and FIGS. 10 and 12 (1c).

BRIEF DESCRIPTION OF THE DRAWING FIGURES

DETAILED DESCRIPTION OF PREFERRED EMBODIMENTS

The hydrogen occluding alloy according to the present invention will now be described in further detail while giving an embodiment.

In an ordinary high-frequency induction melting furnace, Ni, Zr, Ti, Mn, V, La, Ce, Cr and Hf, each of which has a purity higher than 99.9%, and misch metal are used as raw materials and are melted in an Ar atmosphere. As a result, molten alloys, respectively having compositions as shown in Tables 1, 3, 5, 7, 9, 11, 13, 15, 17, 19, 21, 23, 25, 27, 29, 31, 33, 35, 37 and 39 are prepared, followed by being cast in a water-cooled copper casting mold to be formed into ingots. Each of the ingots is heated for homogenization under vacuum at a predetermined temperature within a range of from 900° C. to 1100° C. for 20 hours.

HD 1: After the ingot is maintained at room temperature for 1 hour in a hydrogen atmosphere at a predetermined pressure ranging from 1 to 1.2 atm., it is heated to a predetermined temperature within a range of from 400° C. to 700° C. and maintained thereat for 1 hour. Then, the ingots are subjected to forced air cooling using Ar gas. By the hydrogenating heat treatment processing in accordance with the above conditions, hydrogen occluding alloys 1 to 32 and 98 to 159 according to the present invention (hereinafter called "alloys of the present invention") are prepared.

For comparison, comparative hydrogen occluding alloys having compositions as shown in Tables 1, 5, 17 and 23 are prepared under the same conditions as those described above, except that the hydrogenating heat treatment following the homogenizing heat treatment is omitted.

Figure 1:
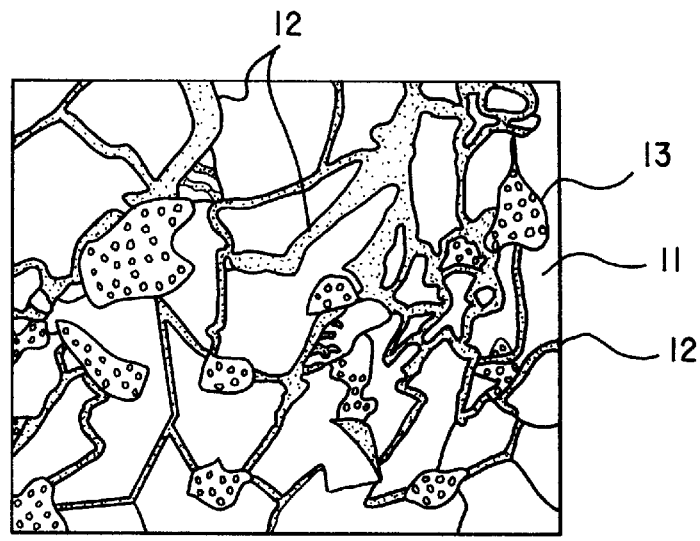
FIG. 1 is an enlarged schematic view of the typical structure of the hydrogen occluding alloys 1 to 14 and 98 to 119 according to the present invention.
Figure 2:
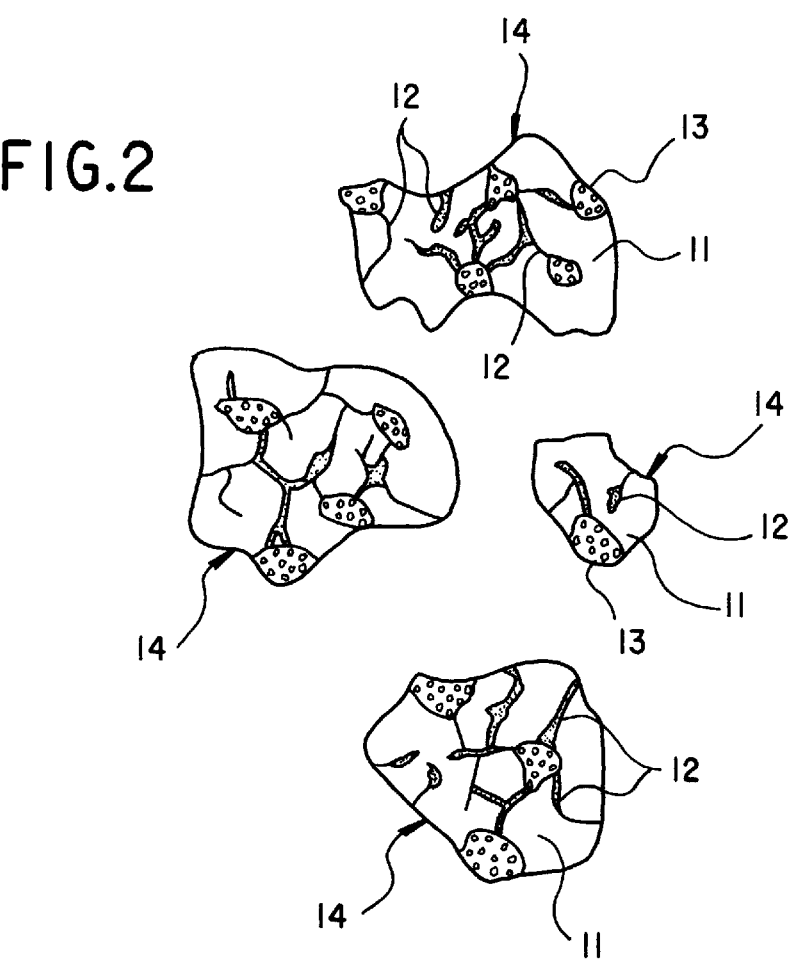
FIG. 2 is an enlarged schematic view of the typical structure of pulverized powder of the hydrogen occluding alloy shown in FIG. 1 according to the present invention.
Figure 3:
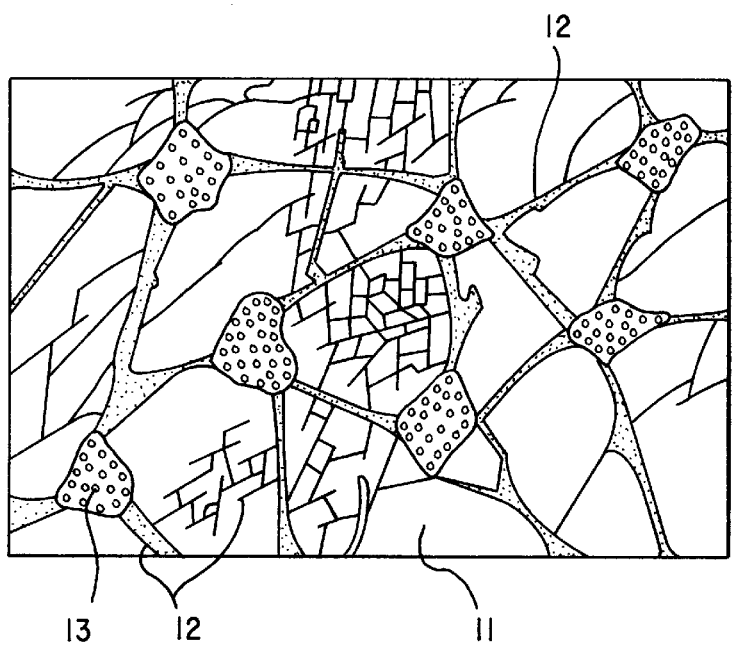
FIG. 3 is an enlarged schematic view of the typical structure of the hydrogen occluding alloys 15 to 32 and 120 to 159 according to the present invention.
Figure 4:
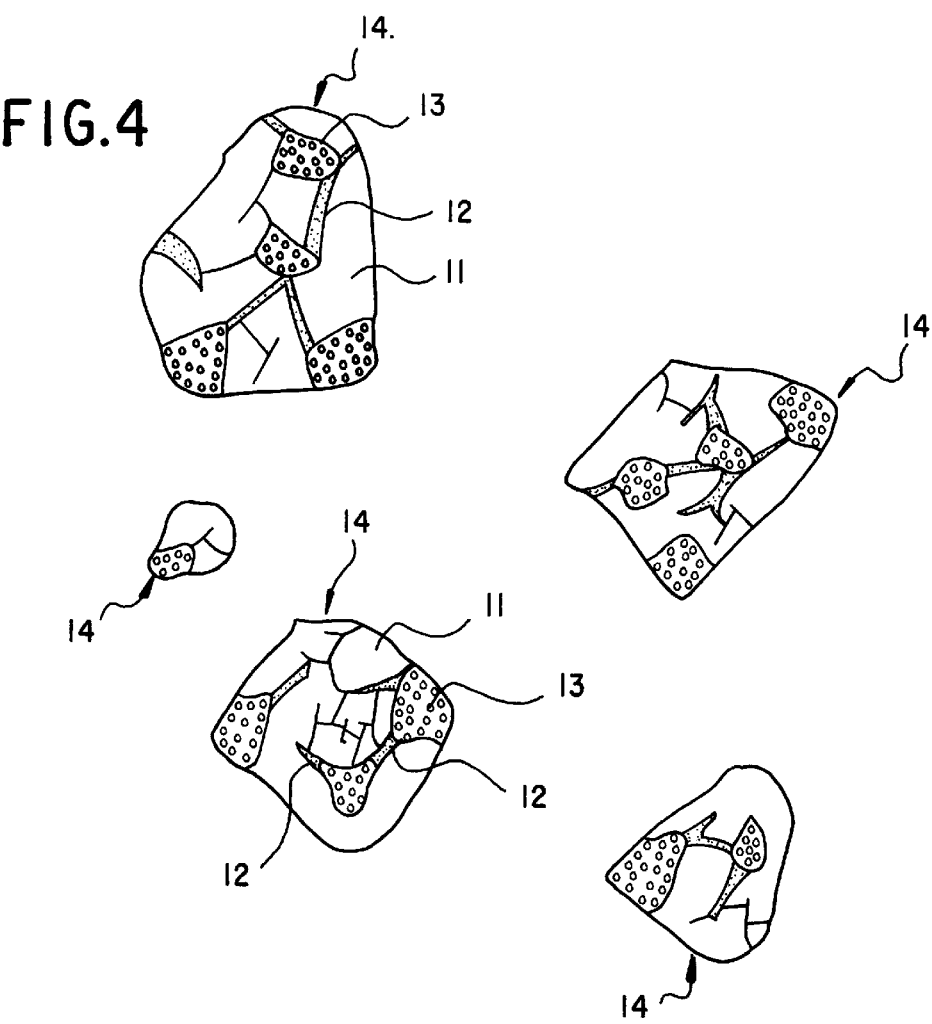
FIG. 4 is an enlarged schematic view of the typical structure of pulverized powder of the hydrogen occluding alloy shown in FIG. 3 according to the present invention.
Figure 13:
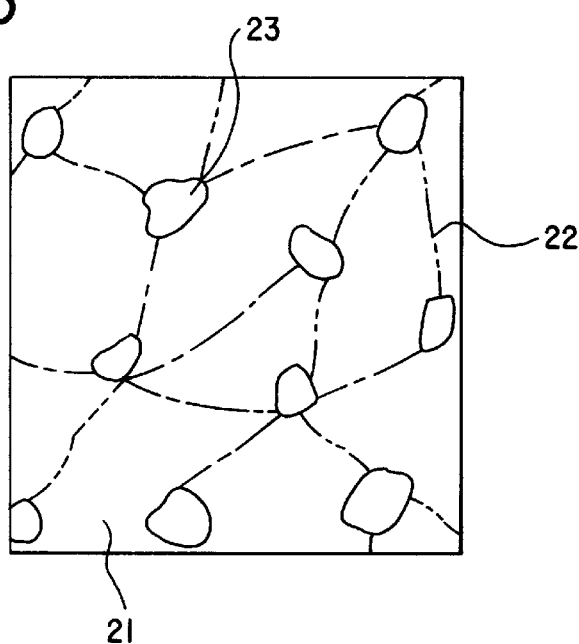
FIG. 13 is an enlarged schematic view of the typical structure of a conventional hydrogen occluding alloy.

The structures of the thus-obtained hydrogen occluding alloys are observed with a scanning electron microscope. As shown in FIGS. 1 and 3, each of the alloys 1 to 32 and 98 to 159 of the present invention exhibits numerous cracks and a phase which is made of a hydrogenated-product and which is exposed on the surfaces of the cracks, wherein the hydrogenated-product dispersedly distributes in a matrix phase made of a Zx—Ni—Mn type alloy. The phase made of a hydrogenated-product is comprising a rare earth element-Ni type alloy and a rare earth element hydride. Meanwhile, the comparative alloy has a structure consisting of a matrix phase 21 made of a Zx—Ni—Mn based alloy and a dispersed phase 23, made of an La—Ni type alloy and distributed along the grain boundary 22 of the matrix phase, as shown in FIG. 13.

HD 2: After the ingot is maintained at room temperature for 1 hour in a hydrogen atmosphere at a predetermined pressure ranging from 1 to 1.2 atm., it is heated to a predetermined temperature within a range of from 400° C. to 700° C. and maintained thereat for 1 hour. Then, the ingots are subjected to forced air cooling using Ar gas. After the hydrogenating heat treatment processing in accordance with the above conditions, the ingots are treated by oxidation such that they are maintained in a 35% KOH aqueous solution for 10 min., followed by drying. Hydrogen occluding alloys 33 to 64 and 160 to 223 according to the present invention "alloys of the present invention" are thereby prepared.

For comparison, comparative hydrogen occluding alloys having compositions as shown in Tables 7, 9, 25 and 31, are prepared under the same conditions as those described above, except that the hydrogenating treatment and the oxidation following the homogenizing heat treatment are omitted.

Figure 5:
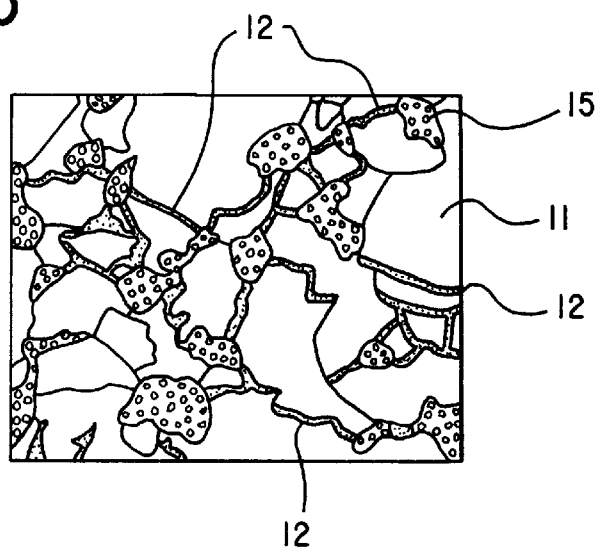
FIG. 5 is an enlarged schematic view of the typical structure of the hydrogen occluding alloys 33 to 45 and 160 to 182 according to the present invention.
Figure 6:
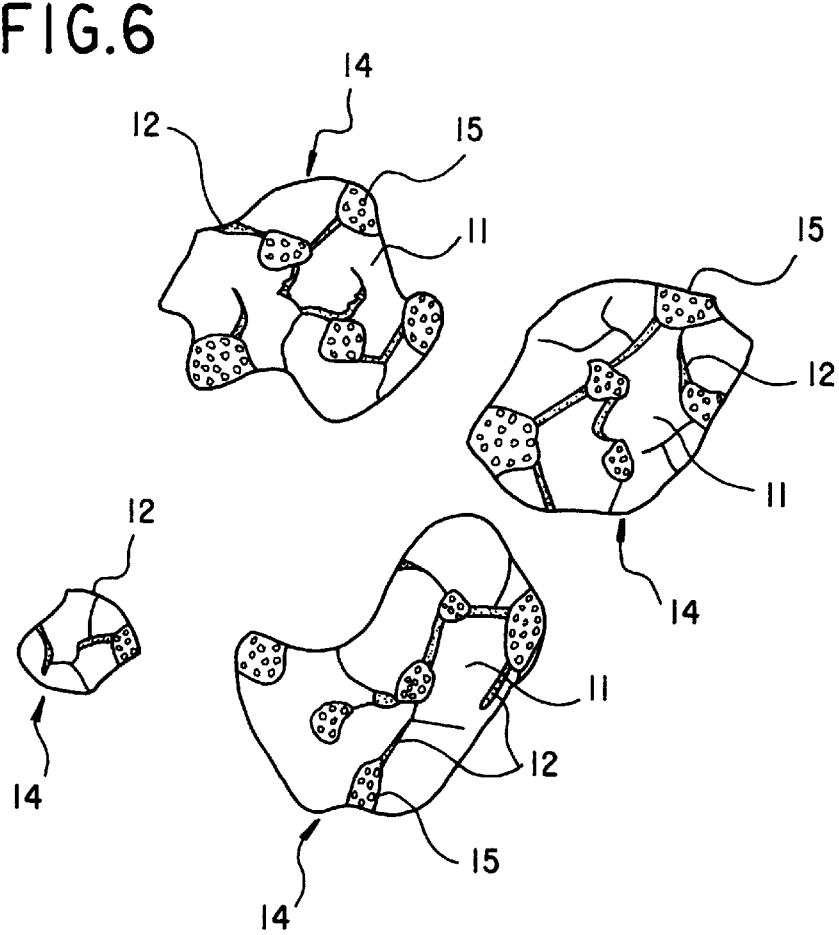
FIG. 6 is an enlarged schematic view of the typical structure of pulverized powder of the hydrogen occluding alloy shown in FIG. 5 according to the present invention.
Figure 7:
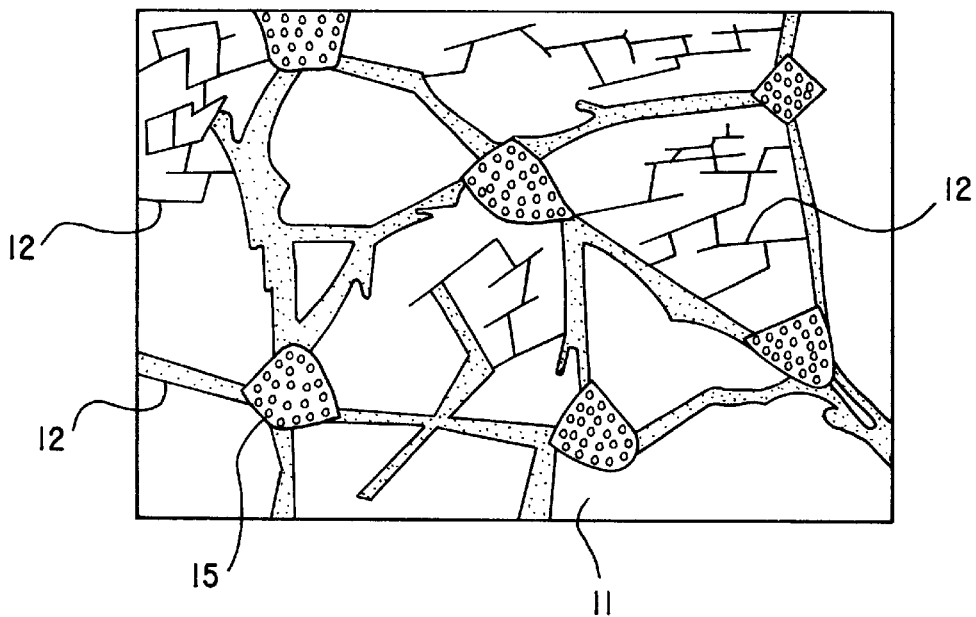
FIG. 7 is an enlarged schematic view of the typical structure of the hydrogen occluding alloys 46 to 64 and 183 to 223 according to the present invention.
Figure 8:
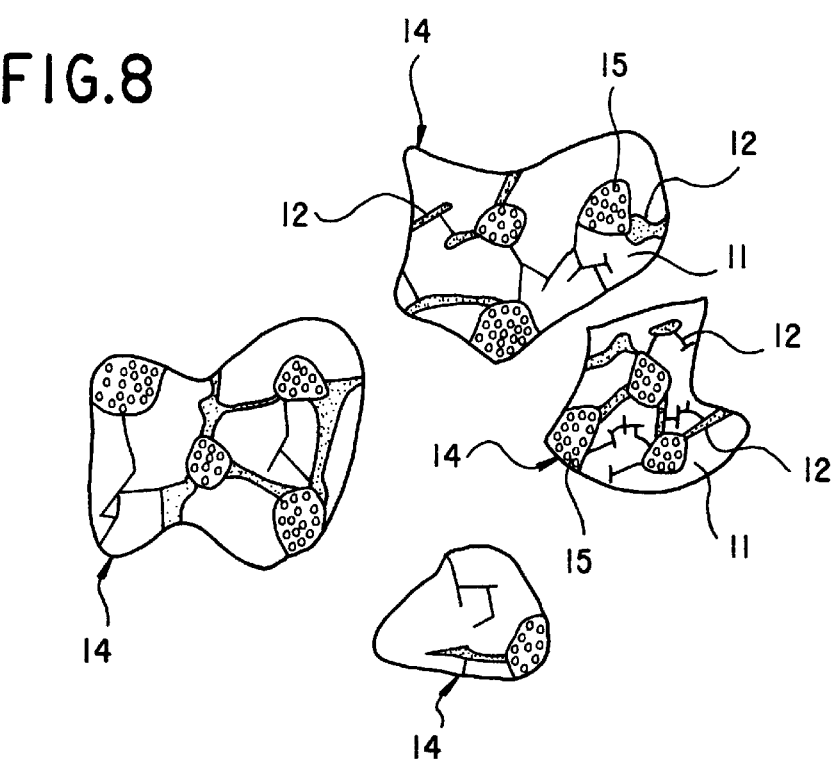
FIG. 8 is an enlarged schematic view of the typical structure of pulverized powder of the hydrogen occluding alloy shown in FIG. 7 according to the present invention.

The structures of the thus-obtained hydrogen occluding alloys are observed with a scanning electron microscope. As shown FIGS. 5 and 7, each of the alloys 33 to 64, 160 to 223 of the present invention exhibits numerous cracks and a hydrogenated-product phase comprising a rare earth element-Ni type alloy and a rare earth element hydroxide is exposed on the surfaces of the cracks, wherein the hydrogenated-product phase is dispersedly distributed in a matrix phase made of a Zx—Ni—Mn type alloy. Meanwhile, the comparative alloy has a structure consisting of a matrix phase made of a Zx—Ni—Mn based alloy and a dispersed phase, which is made of an La—Ni type alloy and distributed along the grain boundary of the matrix phase, as shown in FIG. 13.

HD 3: After the ingot is maintained at room temperature for one hour in a hydrogen atmosphere of a given pressure within a range from 1 to 1.2 atm., it is heated to a predetermined temperature within a range from 400° to 700° C. and subjected to a hydrogenation treatment at the predetermined temperature. After holding the hydrogenation temperature set forth above for one hour, the ingot is subjected to hydrogenation with forced cooling by Ar gas, followed by oxidation in an oxidizing atmosphere at 450° C. for 1 hour. In such a way, hydrogen occluding alloys 65 to 97 and 224 to 287 in accordance with the present invention ("alloys of the present invention") are prepared.

For comparison, comparative hydrogen occluding alloys having the compositions shown in Tables 11, 13, 35 and 39 are prepared under the same conditions as those for the alloys of the present invention, except that the hydrogenation and oxidation processes after homogenization are omitted.

Figure 9:
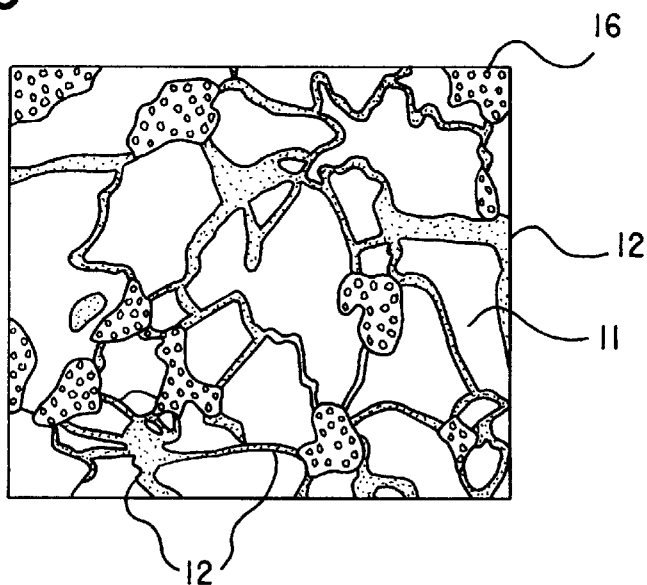
FIG. 9 is an enlarged schematic view of the typical structure of the hydrogen occluding alloys 65 to 79 and 224 to 246 according to the present invention.
Figure 10:
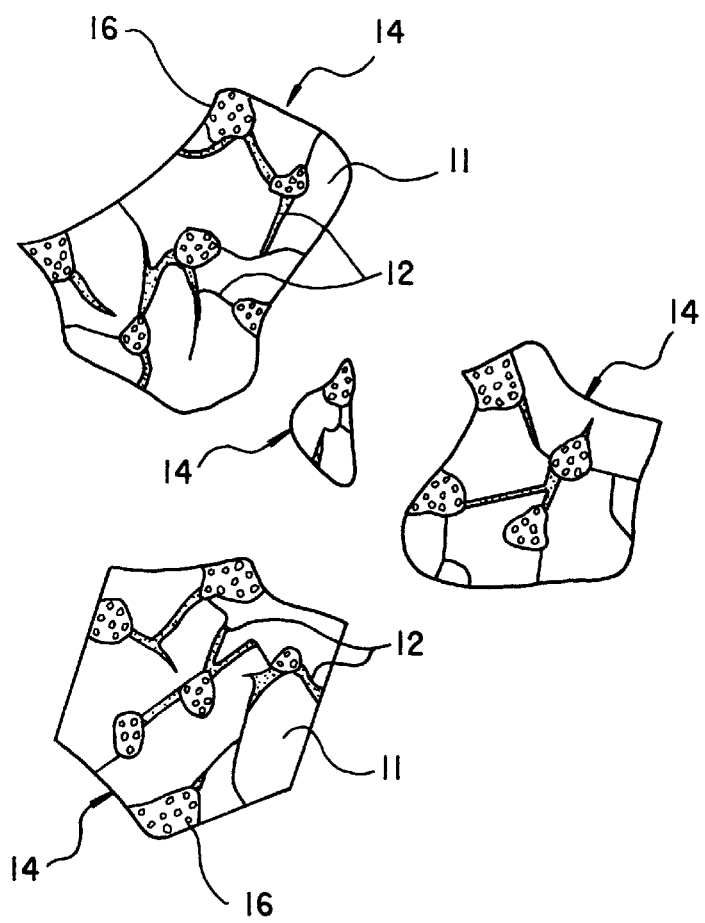
FIG. 10 is an enlarged schematic view of the typical structure of pulverized powder of the hydrogen occluding alloy shown in FIG. 9 according to the present invention.
Figure 11:
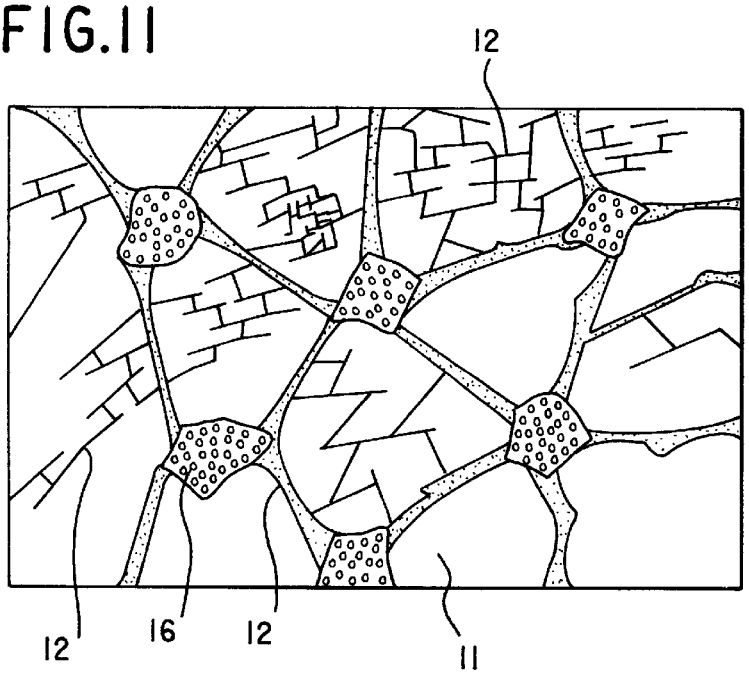
FIG. 11 is an enlarged schematic view of the typical structure of the hydrogen occluding alloys 80 to 97 and 247 to 287 according to the present invention.
Figure 12:
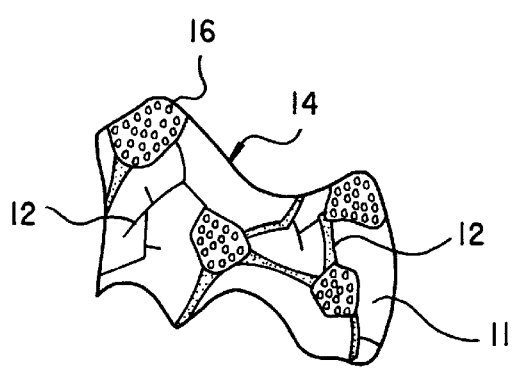
FIG. 12 is an enlarged schematic view of the typical structure of pulverized powder of the hydrogen occluding alloy shown in FIG. 11 according to the present invention.
Figure 12:
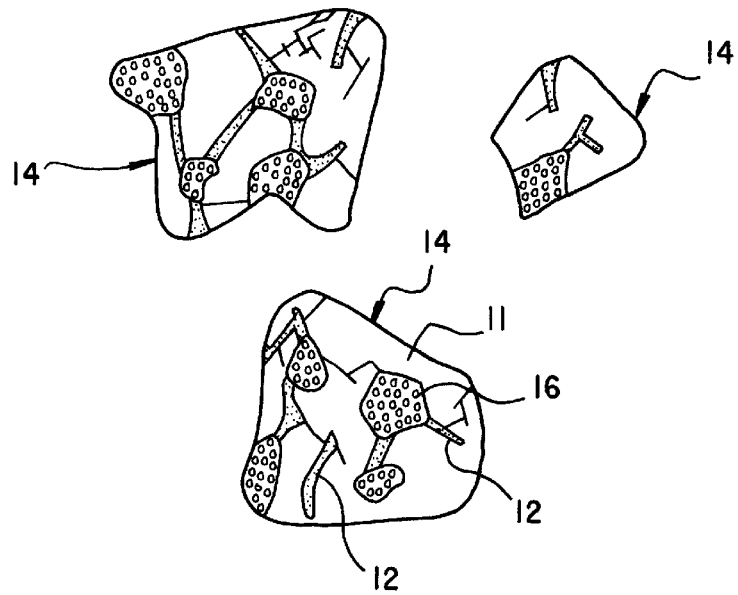

The photographs of the structure of the resulting hydrogen occluding alloys obtained by a scanning electron microscope demonstrate that each of alloys 65 to 97 and 224 to 287 of the present invention has a structure in which numerous cracks exist, the hydrogenated-product phase (comprising the rare earth element-Ni type alloy and the rare earth element oxide) is exposed on the surfaces of cracks, and the hydrogenated-product phase is dispersively distributed in the matrix phase made of the Zr—Ni—Mn based alloy, as shown in FIG. 9 and 11. Whereas, the comparative alloy has a structure in which the dispersion phase made of La—Ni type alloy is distributed along the grain of the matrix phase made of the Zx—Ni—Mn based alloy, as shown in FIG. 13.

Then, the hydrogen absorption rate and the hydrogen desorption rate of each of the alloys 1 to 287 of the present invention and the comparative alloys are measured in accordance with JIS·H7202 "Method for Measuring Hydrogenation Rate of Hydrogen Occluding Alloy".

Prior to the measurement, alloys 1 to 287 of the present invention and the comparative alloys are respectively enclosed in a pressure container and subjected to hydrogenation pulverization including hydrogen absorption in a hydrogen atmosphere of 8 atm. at 200° C. for one hour, and the hydrogen desorption by evacuation. Thus, powder having a grain size of 200 mesh or less is obtained and subjected to the measurements under the following conditions.

Figure 14:
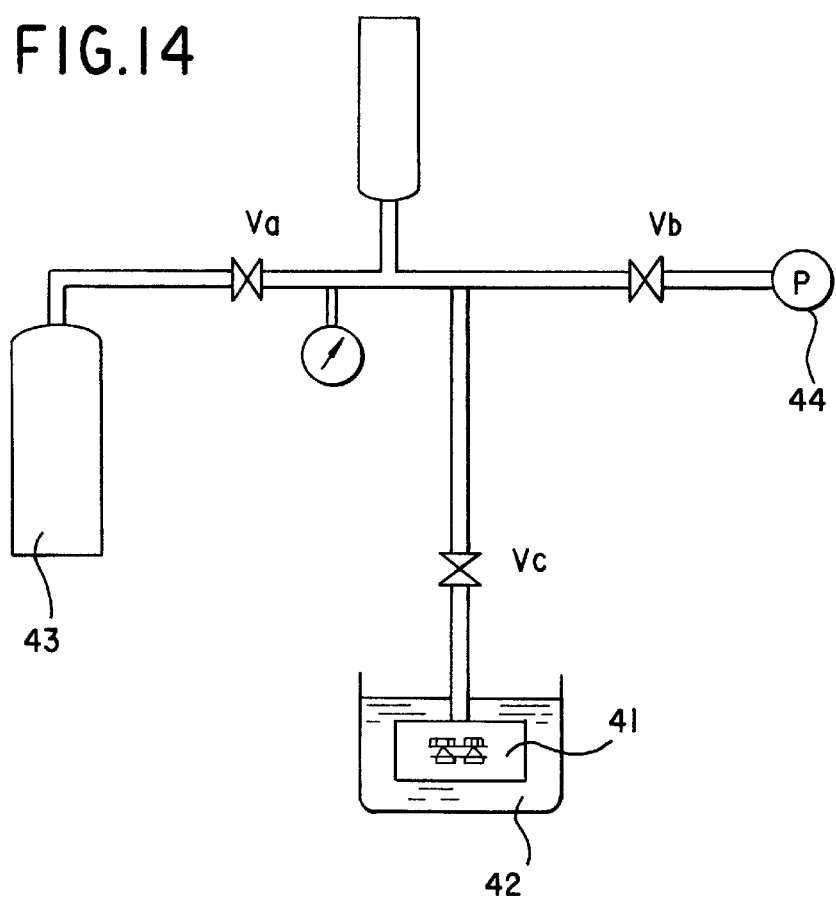
FIG. 14 is a schematic view of the apparatus used for measuring the hydrogen absorption/desorption rates of the hydrogen occluding alloy.
Figure 15:
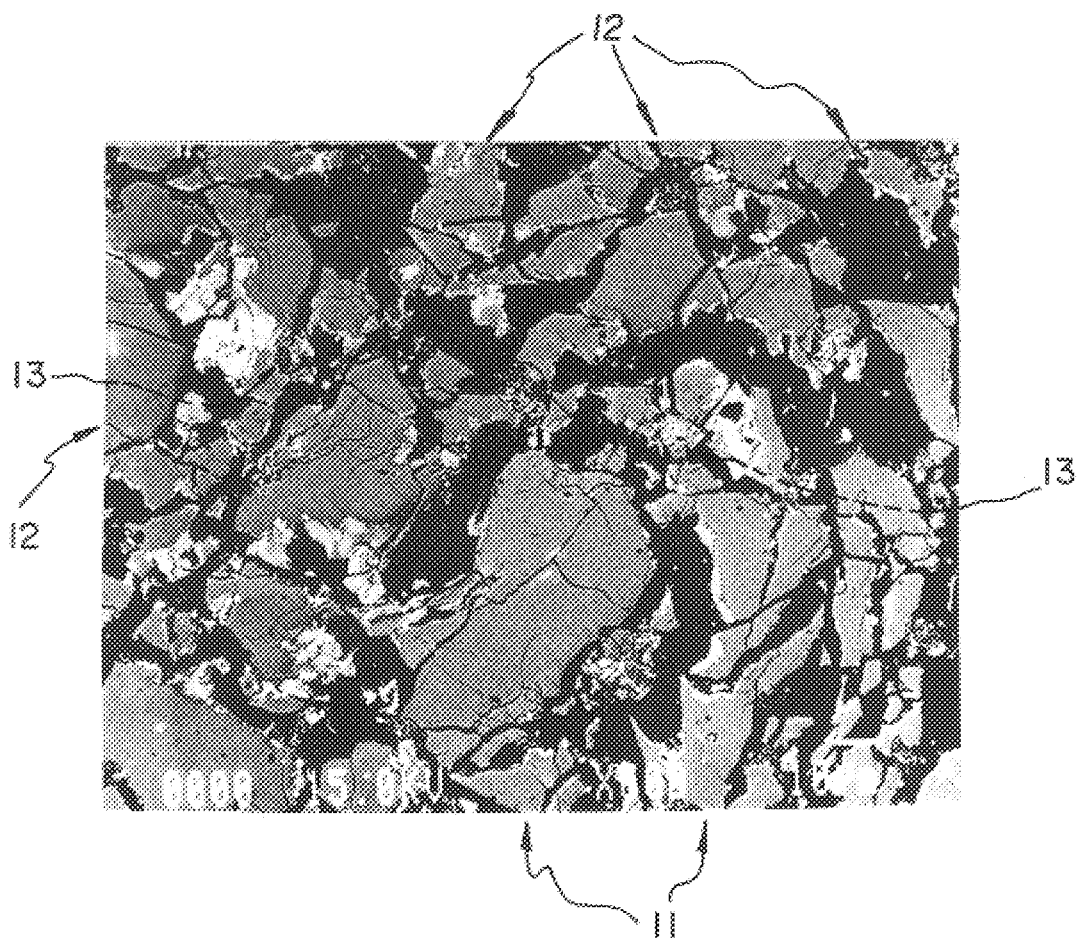
FIG. 15 is an SEM picture of a hydrogen occluding alloy in accordance with embodiment (a1), discussed above.

First, the hydrogen-absorption rate is, as illustrated in a schematic view in FIG. 14, measured as follows:

(a) Powder is enclosed in a container 41 immersed in a (oil or water) bath 42, then a valve V$b$ is closed and valves V$a$ and V$c$ are opened while maintaining the temperature in the bath at 200° C. in order to introduce pressurized hydrogen into the system from a hydrogen cylinder 43. When the pressure in the system reaches 30 atm., the valve V$a$ is closed and the system is then allowed to stand until the pressure in the system decreases to a predetermined level (until the hydrogen absorption is completed). Thus, the powder is initially activated.

(b) After the pressure in the system decreases to a predetermined level (around 20 atm.), the valve V$b$ is opened, followed by lowering the pressure in the system to $10^{-2}$ Torr by a vacuum pump 44. The bath temperature is lowered to 20° C. and the valves V$b$ and V$c$ are closed and the valve V$a$ is opened to introduce hydrogen into the system, except for the container. When the pressure is raised to 30 atm., the valve V$a$ is closed and the valve V$c$ is opened. In such a state, the pressure drop in the system with respect to time is measured. The quantity of occluded hydrogen at the point when the quantity of hydrogen occluded by powder reaches 80%, and time taken to the foregoing moment are obtained from the pressure-drop curve so that (the quantity of occluded hydrogen when the occlusion of 80% is realized)/(the time taken to realize the occlusion of 80%) is calculated. The thus-obtained value is defined as the hydrogen absorption rate.

The hydrogen desorption rate is determined by the following procedure: The bath is maintained at a temperature of, for example, 120° C., appropriate for hydrogen desorption within a range of from 100° C. to 300° C. in a state in which the measurement of the hydrogen absorption rate has been completed, that is, in a state in which the valves V$a$ and V$b$ are closed, the valve V$c$ is opened, and the pressure in the system reaches a predetermined level (Usually around 20 atm.). Then, the valve V$b$ is opened and the valve V$c$ is closed, and in the foregoing state, the pressure in the system, except for the container 41, is evacuated to $10^{-2}$ Torr. Then, the valve V$b$ is closed and the valve V$c$ is opened, and in this state, the pressure rise in the system with respect to time is measured. The quantity of desorbed hydrogen at the point when the quantity of hydrogen desorbed from powder reaches 80%, and time taken to the foregoing moment are obtained from the pressure-rise curve so that (the quantity of desorbed hydrogen when the desorption of 80% is realized) /(the time taken to realize the desorption of 80%) is calculated. The thus-obtained value is defined as the hydrogen desorption rate. The results are shown in Tables 2, 4, 6, 8, 10, 12, 14, 16, 18, 20, 22, 24, 26, 28, 30, 32, 34, 36, 38 and 40.

In addition, each of the alloys 1 to 287 of the present invention and each of the comparative alloys are powdered and included as an active material in a corresponding battery to evaluate the initial activation as will be described in detail. Charging and discharging of the battery are repeated until the battery shows the maximum discharge capacity in order to measure the number of charging and discharging cycles when a discharge capacity corresponding to 95%±1% of the maximum discharge capacity is attained.

That is, the comparative alloys are roughly crushed into coarse grains having a diameter of 2 mm or less by a jaw crusher, then the alloys 1 to 287 of the present invention and the foregoing roughly crushed comparative alloy are finely crushed to a grain size of 200 mesh or less with a ball-mill, respectively, and obtained as paste by adding water, polytetrafluoroethylene (PTFE) as a binder and carboxymethyl cellulose (CMC) as a thickener. After that, each of them is loaded on a corresponding porous sintered Ni plate, which is commercially available and has a porosity of 95%, dried, pressed, and shaped into a plane size of 30 by 40 mm having a thickness of 0.40 to 0.43 mm (the amount of the loaded active material: approximately 1.8 g); then a thin Ni plate to be used as a lead is welded at a side thereof to form a negative electrode. Meanwhile, with respect to the positive electrode, Ni (OH)$_2$ and CoO blended at a ratio of 84:16 by weight are used as the active material. They are rendered pasty adding water, polytetrafluoroethylene (PTFE) as a binder and carboxymethyl cellulose (CMC) as a thickener, loaded on the porous sintered Ni plate, dried, pressed, and shaped into a plane size of 30 by 40 mm with a thickness of 0.71 to 0.73 mm; then a thin Ni plate is installed at a side thereof to form a positive electrode. Afterward, the positive electrodes are provided at both sides of the negative electrodes through corresponding separators made of a polypropylene-polyethylene copolymer, and then, protecting plates made of vinyl chloride are integrated therewith at both sides of the positive electrodes to prevent the active material from dropping from the outside of the positive electrodes.

1 The battery, whose electrode has component composition shown in Table 1, is fabricated by inserting thus-obtained integrated electrodes into a cell made of vinyl chloride and pouring a 35% KOH aqueous solution, as an electrolyte solution, into the cell.

The resultant battery is subjected to charge/discharge cycles under conditions of a charge rate of 0.20 C, a discharge rate of 0.16 C and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Table 2 shows the maximum discharge capacity obtained by the procedure set forth above, as well as the number of charge/discharge cycles as a measure evaluating the initial activation, at which the discharge capacity is 95% of the maximum discharge capacity.

2 The battery, whose electrode has component composition shown in Samples 15–32 and COM-2 (Tables 3 and 5), is fabricated by inserting thus-obtained integrated electrodes into a cell made of vinyl chloride and pouring a 35% KOH aqueous solution, as an electrolyte solution, into the cell.

The resultant battery is subjected to charge/discharge cycles under conditions of a charge rate of 0.20 C, a discharge rate of 0.20 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 4 and 6 show the maximum discharge capacity obtained by the procedure set forth above, as well as the number of charge/discharge cycles as a measure evaluating the initial activation, at which the discharge capacity is 95% of the maximum discharge capacity.

3 The battery, whose electrode has component composition shown in Samples 33–45 and COM-3 (Tables 5 and 7), is fabricated by inserting thus-obtained integrated electrodes into a cell made of vinyl chloride and pouring a 35% KOH aqueous solution, as an electrolyte solution, into the cell.

The resultant battery is subjected to charge/discharge cycles under conditions of a charge rate of 0.25 C, a discharge rate of 0.18 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 6 and 8 show the maximum discharge capacity obtained by the procedure set forth above, as well as the number of charge/discharge cycles as a measure evaluating the initial activation, at which the discharge capacity is 95% of the maximum discharge capacity.

4 The battery, whose electrode has component composition shown in Samples 46–64 and COM-4 (Tables 7 and 9), is fabricated by inserting thus-obtained integrated electrodes into a cell made of vinyl chloride and pouring a 35% KOH aqueous solution, as an electrolyte solution, into the cell.

The resultant battery is subjected to charge/discharge cycles under conditions of a charge rate of 0.18 C, a discharge rate of 0.16 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 8 and 10 show the maximum discharge capacity obtained by the procedure set forth above, as well as the number of charge/discharge cycles as a measure evaluating the initial activation, at which the discharge capacity is 95% of the maximum discharge capacity.

5 The battery, whose electrode has component composition shown in Samples 65–79 and COM-5 (Tables 9 and 11), is fabricated by inserting thus-obtained integrated electrodes into a cell made of vinyl chloride and pouring a 35% KOH aqueous solution, as an electrolyte solution, into the cell.

The resultant battery is subjected to charge/discharge cycles under conditions of a charge rate of 0.22 C, a discharge rate of 0.20 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 10 and 12 show the maximum discharge capacity obtained by the procedure set forth above, as well as the number of charge/discharge cycles as a measure evaluating the initial activation, at which the discharge capacity is 95% of the maximum discharge capacity.

6 The battery, whose electrode has component composition shown in Samples 80–97 and COM-6 (Tables 11 and 13), is fabricated by inserting thus-obtained integrated electrodes into a cell made of vinyl chloride and pouring a 35% KOH aqueous solution, as an electrolyte solution, into the cell.

The resultant battery is subjected to charge/discharge cycles under conditions of a charge rate of 0.25 C, a discharge rate of 0.20 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 12 and 14 show the maximum discharge capacity obtained by the procedure set forth above, as well as the number of charge/discharge cycles as a measure evaluating the initial activation, at which the discharge capacity is 95% of the maximum discharge capacity.

7 The battery, whose electrode has component composition shown in Samples 98–287 and COM-7 through COM-12 (Tables 13, 15, 17, 19, 21, 23, 25, 27, 29, 31, 33, 35, 37 and 39) is fabricated by inserting thus-obtained integrated electrodes into a cell made of vinyl chloride and pouring a 30% KOH aqueous solution, as an electrolyte solution, into the cell.

The resultant battery is subjected to charge/discharge cycles under conditions of a charge rate of 0.15 C, a discharge rate of 0.15 C, and a quantity of charged capacity corresponding to 135% of the negative electrode capacity. The charge/discharge cycles are repeated until the battery exhibits the maximum discharge capacity, in which one cycle of charge and discharge is counted as one charge/discharge.

Tables 14, 16, 18, 20, 22, 24, 26, 28, 30, 32, 34, 36, 38 and 40 show the maximum discharge capacity obtained by the procedure set forth above, as well as the number of charge/discharge cycles as a measure evaluating the initial activation, at which the discharge capacity is 95% of the maximum discharge capacity.

It is understood from the results shown in Tables 2, 4, 6, 8, 10, 12, 14, 16, 18, 20, 22, 24, 26, 28, 30, 32, 34, 36, 38 and 40 that each of the alloys 1 to 287 of the present invention exhibits relatively and significantly high hydrogen-absorption rates and significantly enhanced initial activation because the rare earth element-Ni type alloy exhibiting a significantly rapid hydrogen absorption is distributed over a broad surface area as a whole. That is, the atmospheric hydrogen is desorbed as the hydrogen atoms and absorbed through the rare earth element-Ni type alloy included in the phase made of hydrogenated products, which phase is exposed over a large surface area with respect to the atmosphere as a whole because it is exposed on the surface and the surfaces of the numerous cracks. Directly or through the rare earth element hydride, the absorbed hydrogen is diffused into the matrix phase made of the Zx—Ni—Mn based alloy to be occluded therein. Moreover, the hydrogen desorption rate is also high because it proceeds in accordance with a mechanism contrary to the foregoing.

TABLE I

| | Component Composition (wt %) | | | | | | | | | | | |
| | | | | | Rare Earth Elements | | | | | | | Ni + |
| Sample No. | Zr | Ti | Mn | V | La | Ce | Pr | Nd | Hf | H | O | impurity |
|---|---|---|---|---|---|---|---|---|---|---|---|---|
| 1 | 25.1 | 6.0 | 15.6 | 5.1 | 0.9 | 2.0 | — | — | — | 0.063 | — | Bal. |
| 2 | 30.3 | 5.9 | 16.2 | 5.2 | — | 3.4 | — | — | — | 0.067 | — | Bal. |
| 3 | 34.6 | 5.7 | 16.1 | 5.0 | 3.1 | — | — | — | — | 0.064 | — | Bal. |
| 4 | 36.8 | 5.2 | 15.7 | 4.9 | 1.5 | 1.6 | — | — | — | 0.065 | — | Bal. |
| 5 | 34.3 | 10.2 | 16.1 | 5.2 | 3.0 | — | — | — | — | 0.066 | — | Bal. |
| 6 | 34.3 | 6.0 | 10.3 | 5.3 | 2.9 | — | — | — | — | 0.063 | — | Bal. |
| 7 | 34.4 | 5.9 | 17.3 | 4.9 | — | 3.2 | — | — | — | 0.066 | — | Bal. |
| 8 | 34.5 | 6.2 | 19.6 | 5.0 | — | 3.6 | — | — | — | 0.071 | — | Bal. |
| 9 | 34.8 | 6.0 | 15.7 | 2.9 | 1.6 | 1.2 | — | — | — | 0.062 | — | Bal. |
| 10 | 34.1 | 6.2 | 16.4 | 5.1 | 0.53 | — | — | — | — | 0.016 | — | Bal. |
| 11 | 34.7 | 6.0 | 15.9 | 5.2 | — | 0.54 | — | — | — | 0.017 | — | Bal. |
| 12 | 34.7 | 6.1 | 16.1 | 4.9 | 2.1 | — | — | — | — | 0.054 | — | Bal. |
| 13 | 34.5 | 6.1 | 16.2 | 5.0 | — | 4.8 | — | — | — | 0.085 | — | Bal. |
| 14 | 34.7 | 6.0 | 15.6 | 5.2 | 2.3 | 2.5 | — | — | — | 0.086 | — | Bal. |
| COM-1 | 21.9 | 12.7 | 24.6 | Cr: 23.3 | 3.7 | — | — | — | — | — | — | Bal. |

COM: Comparative
Bal.: Balance

TABLE 2

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 1 | 0.19 | 0.19 | 385 | 3 |
| 2 | 0.18 | 0.18 | 400 | 2 |
| 3 | 0.19 | 0.20 | 420 | 2 |
| 4 | 0.20 | 0.20 | 417 | 2 |
| 5 | 0.20 | 0.20 | 421 | 2 |
| 6 | 0.19 | 0.19 | 417 | 3 |
| 7 | 0.19 | 0.20 | 417 | 2 |
| 8 | 0.20 | 0.19 | 419 | 2 |
| 9 | 0.19 | 0.18 | 415 | 2 |
| 10 | 0.17 | 0.16 | 420 | 5 |
| 11 | 0.17 | 0.18 | 418 | 4 |
| 12 | 0.19 | 0.19 | 416 | 3 |
| 13 | 0.20 | 0.21 | 415 | 1 |
| 14 | 0.21 | 0.21 | 416 | 2 |
| COM-1 | 0.07 | 0.07 | 355 | 19 |

COM: Comparative

TABLE 3

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 15 | 30.1 | 6.1 | 15.6 | 5.0 | 1.7 | 1.6 | — | — | 1.5 | 0.076 | — | Bal. |
| 16 | 34.5 | 6.2 | 15.8 | 5.0 | 3.3 | — | — | — | 1.5 | 0.077 | — | Bal. |
| 17 | 36.9 | 5.1 | 16.1 | 4.9 | 1.2 | 2.4 | — | — | 1.3 | 0.081 | — | Bal. |
| 18 | 34.3 | 9.9 | 15.9 | 5.2 | 3.0 | — | — | — | 1.4 | 0.075 | — | Bal. |
| 19 | 34.3 | 5.8 | 102 | 5.1 | 3.4 | — | — | — | 1.3 | 0.079 | — | Bal. |
| 20 | 34.4 | 6.1 | 19.3 | 4.8 | 1.5 | 1.9 | — | — | 1.5 | 0.080 | — | Bal. |
| 21 | 34.6 | 5.9 | 16.2 | 2.3 | — | 3.0 | — | — | 1.4 | 0.075 | — | Bal. |
| 22 | 34.2 | 5.8 | 15.9 | 8.6 | 2.9 | — | — | — | 1.4 | 0.074 | — | Bal. |
| 23 | 34.4 | 6.0 | 15.8 | 11.6 | 1.7 | 1.6 | — | — | 1.3 | 0.078 | — | Bal. |
| 24 | 34.6 | 6.0 | 15.9 | 5.2 | 1.9 | — | — | — | 1.4 | 0.062 | — | Bal. |
| 25 | 34.4 | 5.9 | 16.3 | 5.1 | 4.4 | — | — | — | 1.5 | 0.126 | — | Bal. |
| 26 | 34.2 | 6.3 | 15.6 | 4.9 | — | 1.5 | — | — | 1.4 | 0.057 | — | Bal. |
| 27 | 34.7 | 5.9 | 16.3 | 5.2 | — | 4.6 | — | — | 1.3 | 0.127 | — | Bal. |
| 28 | 34.3 | 6.2 | 16.2 | 5.1 | 1.0 | 1.0 | — | — | 0.12 | 0.063 | — | Bal. |
| 29 | 34.4 | 5.8 | 16.1 | 5.0 | 3.1 | — | — | — | 0.12 | 0.076 | — | Bal. |

Bal.: Balance

TABLE 4

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 15 | 0.17 | 0.18 | 407 | 3 |
| 16 | 0.19 | 0.19 | 419 | 2 |
| 17 | 0.20 | 0.19 | 415 | 2 |
| 18 | 0.20 | 0.20 | 417 | 2 |
| 19 | 0.19 | 0.18 | 417 | 2 |
| 20 | 0.18 | 0.19 | 419 | 2 |
| 21 | 0.16 | 0.16 | 410 | 2 |
| 22 | 0.17 | 0.18 | 419 | 1 |
| 23 | 0.19 | 0.20 | 422 | 2 |
| 24 | 0.19 | 0.18 | 420 | 4 |
| 25 | 0.22 | 0.23 | 417 | 2 |
| 26 | 0.19 | 0.18 | 419 | 3 |
| 27 | 0.23 | 0.22 | 416 | 1 |
| 28 | 0.18 | 0.18 | 416 | 2 |
| 29 | 0.19 | 0.19 | 418 | 2 |

TABLE 6

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 30 | 0.19 | 0.20 | 419 | 2 |
| 31 | 0.18 | 0.18 | 418 | 2 |
| 32 | 0.19 | 0.20 | 419 | 1 |
| COM-2 | 0.08 | 0.08 | 360 | 18 |
| 33 | 0.18 | 0.18 | 405 | 1 |
| 34 | 0.20 | 0.19 | 418 | 2 |
| 35 | 0.19 | 0.20 | 419 | 2 |
| 36 | 0.20 | 0.21 | 417 | 2 |
| 37 | 0.20 | 0.19 | 420 | 2 |
| 38 | 0.19 | 0.19 | 418 | 2 |
| 39 | 0.20 | 0.20 | 417 | 3 |
| 40 | 0.18 | 0.17 | 410 | 2 |
| 41 | 0.20 | 0.20 | 415 | 2 |

TABLE 5

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 30 | 34.4 | 6.1 | 15.9 | 5.1 | — | 2.8 | — | — | 0.62 | 0.072 | — | Bal. |
| 31 | 34.6 | 5.9 | 16.0 | 4.9 | 1.7 | 1.3 | — | — | 0.59 | 0.075 | — | Bal. |
| 32 | 34.2 | 6.0 | 15.8 | 4.8 | 3.2 | — | — | — | 1.8 | 0.077 | — | Bal. |
| COM-2 | 21.0 | 12.5 | 24.7 | Cr: 23.5 | — | — | — | — | — | — | — | Bal. |
| 33 | 30.8 | 6.1 | 15.9 | 5.3 | — | 3.3 | — | — | — | 0.087 | 1.15 | Bal. |
| 34 | 34.5 | 6.1 | 16.1 | 5.0 | 3.0 | — | — | — | — | 0.085 | 1.09 | Bal. |
| 35 | 36.9 | 5.3 | 16.3 | 4.8 | 1.6 | 1.4 | — | — | — | 0.082 | 1.12 | Bal. |
| 36 | 34.2 | 9.8 | 15.8 | 5.1 | 3.1 | — | — | — | — | 0.084 | 1.13 | Bal. |
| 37 | 34.2 | 5.9 | 10.4 | 4.9 | 3.0 | — | — | — | — | 0.082 | 1.03 | Bal. |
| 38 | 34.2 | 5.8 | 15.4 | 5.0 | — | 3.1 | — | — | — | 0.085 | 1.08 | Bal. |
| 39 | 34.1 | 5.9 | 17.3 | 4.9 | — | 3.5 | — | — | — | 0.089 | 1.15 | Bal. |
| 40 | 34.4 | 6.1 | 19.5 | 5.1 | 1.9 | 0.8 | — | — | — | 0.079 | 0.98 | Bal. |
| 41 | 34.3 | 5.9 | 15.8 | 3.0 | 1.5 | 1.5 | — | — | — | 0.082 | 1.00 | Bal. |
| 42 | 34.7 | 5.9 | 15.8 | 2.8 | — | 0.59 | — | — | — | 0.019 | 0.38 | Bal. |
| 43 | 34.8 | 6.1 | 16.1 | 4.9 | 2.0 | — | — | — | — | 0.062 | 0.75 | Bal. |

COM: Comparative
Bal.: Balance

TABLE 6-continued

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 42 | 0.18 | 0.17 | 420 | 2 |
| 43 | 0.19 | 0.18 | 419 | 2 |

COM: Comparative

TABLE 7

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 44 | 34.9 | 5.9 | 15.9 | 5.1 | — | 5.0 | — | — | — | 0.107 | 1.58 | Bal. |
| 45 | 34.7 | 6.2 | 16.2 | 4.9 | 2.5 | 2.2 | — | — | — | 0.099 | 1.49 | Bal. |
| COM-3 | 21.3 | 12.8 | 24.8 | Cr: 23.6 | 3.1 | — | — | — | — | — | — | Bal. |
| 46 | 25.1 | 5.8 | 15.9 | 5.2 | 1.7 | 1.6 | — | — | 1.4 | 0.097 | 1.10 | Bal. |
| 47 | 30.3 | 5.9 | 16.1 | 4.9 | 1.8 | 1.7 | — | — | 1.4 | 0.101 | 1.16 | Bal. |
| 48 | 34.1 | 6.0 | 16.0 | 5.1 | 3.2 | — | — | — | 1.3 | 0.095 | 1.08 | Bal. |
| 49 | 36.7 | 5.2 | 16.2 | 5.0 | 1.0 | 2.4 | — | — | 1.5 | 0.099 | 1.14 | Bal. |
| 50 | 34.0 | 10.3 | 16.4 | 5.1 | 2.8 | — | — | — | 1.4 | 0.088 | 0.97 | Bal. |
| 51 | 34.5 | 6.2 | 10.5 | 4.8 | 3.4 | — | — | — | 1.3 | 0.099 | 1.14 | Bal. |
| 52 | 34.4 | 6.3 | 19.8 | 4.9 | 1.7 | 1.7 | — | — | 1.5 | 0.099 | 1.15 | Bal. |
| 53 | 34.3 | 5.9 | 15.8 | 2.2 | — | 2.9 | — | — | 1.3 | 0.090 | 1.00 | Bal. |
| 54 | 34.4 | 6.3 | 16.0 | 8.2 | 3.3 | — | — | — | 1.3 | 0.097 | 1.11 | Bal. |
| 55 | 34.2 | 6.1 | 15.7 | 11.7 | 1.6 | 1.7 | — | — | 1.4 | 0.098 | 1.12 | Bal. |
| 56 | 34.6 | 6.0 | 16.2 | 5.0 | 2.0 | — | — | — | 1.4 | 0.075 | 0.75 | Bal. |
| 57 | 34.2 | 6.1 | 16.1 | 4.9 | 4.5 | — | — | — | 1.5 | 0.169 | 2.27 | Bal. |

COM: Comparative
Bal.: Balance

TABLE 8

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 44 | 0.20 | 0.20 | 418 | 2 |
| 45 | 0.22 | 0.22 | 418 | 1 |
| COM-3 | 0.08 | 0.08 | 360 | 19 |
| 46 | 0.18 | 0.20 | 390 | 2 |
| 47 | 0.18 | 0.19 | 405 | 3 |
| 48 | 0.19 | 0.18 | 418 | 2 |
| 49 | 0.19 | 0.19 | 414 | 2 |
| 50 | 0.20 | 0.19 | 418 | 2 |
| 51 | 0.19 | 0.18 | 415 | 2 |
| 52 | 0.19 | 0.19 | 417 | 2 |
| 53 | 0.16 | 0.11 | 408 | 3 |
| 54 | 0.18 | 0.18 | 418 | 2 |
| 55 | 0.19 | 0.20 | 422 | 2 |
| 56 | 0.19 | 0.20 | 419 | 3 |
| 57 | 0.23 | 0.24 | 415 | 1 |

COM: Comparative

TABLE 9

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 58 | 34.8 | 5.9 | 15.9 | 5.0 | — | 1.9 | — | — | 1.4 | 0.073 | 0.73 | Bal. |
| 59 | 34.4 | 6.2 | 15.8 | 5.1 | — | 4.8 | — | — | 1.2 | 0.173 | 2.32 | Bal. |
| 60 | 34.3 | 5.8 | 16.0 | 5.0 | 0.9 | 1.3 | — | — | 0.11 | 0.078 | 0.81 | Bal. |
| 61 | 34.5 | 6.0 | 16.1 | 4.8 | 3.0 | — | — | — | 0.12 | 0.092 | 1.03 | Bal. |
| 62 | 34.5 | 6.1 | 16.3 | 4.7 | — | 2.9 | — | — | 0.60 | 0.090 | 0.99 | Bal. |
| 63 | 34.6 | 5.9 | 15.7 | 4.9 | 1.6 | 1.5 | — | — | 0.61 | 0.094 | 1.05 | Bal. |
| 64 | 34.2 | 6.0 | 15.9 | 5.1 | 2.9 | — | — | — | 1.91 | 0.091 | 1.01 | Bal. |
| COM-4 | 22.0 | 13.1 | 24.9 | Cr: 23.6 | 3.5 | — | — | — | — | — | — | Bal. |
| 65 | 25.5 | 6.2 | 16.0 | 4.9 | 1.0 | 2.1 | — | — | — | — | 0.61 | Bal. |
| 66 | 29.2 | 5.8 | 15.9 | 5.0 | — | 3.1 | — | — | — | — | 0.65 | Bal. |
| 67 | 34.7 | 5.9 | 15.8 | 4.8 | 3.3 | — | — | — | — | — | 0.66 | Bal. |
| 68 | 36.7 | 5.4 | 16.1 | 5.1 | 1.4 | 1.7 | — | — | — | — | 0.61 | Bal. |

TABLE 9-continued

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 69 | 34.7 | 10.8 | 15.9 | 5.2 | 3.0 | — | — | — | — | — | 0.60 | Bal. |
| 70 | 34.5 | 6.1 | 10.1 | 5.2 | — | 2.7 | — | — | — | — | 0.57 | Bal. |
| 71 | 34.7 | 6.2 | 15.2 | 4.8 | 3.1 | — | — | — | — | — | 0.62 | Bal. |

COM: Comparative
Bal.: Balance

TABLE 10

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 58 | 0.18 | 0.19 | 418 | 3 |
| 59 | 0.22 | 0.24 | 414 | 2 |
| 60 | 0.18 | 0.19 | 416 | 2 |
| 61 | 0.19 | 0.19 | 418 | 2 |
| 62 | 0.18 | 0.20 | 418 | 2 |
| 63 | 0.18 | 0.19 | 419 | 2 |
| 64 | 0.19 | 0.20 | 419 | 1 |
| COM-4 | 0.08 | 0.09 | 362 | 18 |
| 65 | 0.18 | 0.18 | 380 | 2 |
| 66 | 0.18 | 0.19 | 395 | 1 |
| 67 | 0.19 | 0.21 | 421 | 2 |
| 68 | 0.21 | 0.20 | 419 | 2 |
| 69 | 0.19 | 0.20 | 419 | 2 |
| 70 | 0.19 | 0.20 | 418 | 3 |
| 71 | 0.19 | 0.20 | 417 | 2 |

COM: Comparative

TABLE 12

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 72 | 0.19 | 0.20 | 419 | 2 |
| 73 | 0.16 | 0.18 | 420 | 3 |
| 74 | 0.18 | 0.18 | 414 | 2 |
| 75 | 0.16 | 0.15 | 423 | 4 |
| 76 | 0.17 | 0.17 | 417 | 4 |
| 77 | 0.19 | 0.19 | 415 | 3 |
| 78 | 0.21 | 0.20 | 413 | 2 |
| 79 | 0.21 | 0.21 | 415 | 1 |
| COM-5 | 0.07 | 0.08 | 357 | 18 |
| 80 | 0.19 | 0.20 | 404 | 2 |
| 81 | 0.19 | 0.18 | 420 | 3 |
| 82 | 0.20 | 0.20 | 411 | 2 |
| 83 | 0.19 | 0.20 | 416 | 2 |
| 84 | 0.19 | 0.19 | 417 | 2 |
| 85 | 0.19 | 0.19 | 418 | 2 |

COM: Comparative

TABLE 11

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 72 | 34.8 | 6.1 | 17.9 | 4.9 | — | 3.5 | — | — | — | — | 0.70 | Bal. |
| 73 | 34.7 | 5.9 | 19.9 | 5.2 | 2.1 | 0.7 | — | — | — | — | 0.59 | Bal. |
| 74 | 34.9 | 6.1 | 15.9 | 2.7 | 1.5 | 1.4 | — | — | — | — | 0.59 | Bal. |
| 75 | 34.2 | 6.0 | 16.3 | 4.8 | 0.56 | — | — | — | — | — | 0.28 | Bal. |
| 76 | 34.1 | 5.9 | 15.9 | 5.1 | — | 0.59 | — | — | — | — | 0.29 | Bal. |
| 77 | 34.6 | 6.1 | 15.8 | 5.0 | 2.2 | — | — | — | — | — | 0.47 | Bal. |
| 78 | 34.5 | 6.2 | 16.2 | 5.1 | — | 5.0 | — | — | — | — | 0.91 | Bal. |
| 79 | 34.7 | 5.8 | 16.1 | 4.9 | 2.6 | 2.4 | — | — | — | — | 0.85 | Bal. |
| COM-5 | 22.0 | 12.7 | 24.9 | Cr: 23.5 | 3.2 | — | — | — | — | — | — | Bal. |
| 80 | 29.8 | 6.0 | 16.3 | 4.9 | 1.8 | 1.6 | — | — | 1.3 | — | 0.67 | Bal. |
| 81 | 34.2 | 5.9 | 16.2 | 5.0 | 3.3 | — | — | — | 1.4 | — | 0.66 | Bal. |
| 82 | 36.1 | 5.2 | 16.2 | 4.8 | 1.6 | 2.0 | — | — | 1.4 | — | 0.70 | Bal. |
| 83 | 34.5 | 10.1 | 16.1 | 4.7 | 3.1 | — | — | — | 1.2 | — | 0.62 | Bal. |
| 84 | 34.3 | 6.2 | 10.3 | 5.3 | 3.4 | — | — | — | 1.4 | — | 0.66 | Bal. |
| 85 | 34.4 | 6.1 | 19.5 | 5.0 | 1.8 | 1.5 | — | — | 1.5 | — | 0.65 | Bal. |

COM: Comparative
Bal.: Balance

TABLE 13

| Sample No. | Component Composition (wt %) | | | | | | | | | | | |
|---|---|---|---|---|---|---|---|---|---|---|---|---|
| | Zr | Ti | Mn | V | Rare Earth Elements | | | | | H | O | Ni + impurity |
| | | | | | La | Ce | Pr | Nd | Hf | | | |
| 86 | 34.5 | 5.8 | 15.9 | 2.1 | — | 3.2 | — | — | 1.4 | — | 0.64 | Bal. |
| 87 | 34.6 | 6.0 | 16.0 | 8.2 | 3.2 | — | — | — | 1.5 | — | 0.64 | Bal. |
| 88 | 34.5 | 6.1 | 15.9 | 11.5 | 1.5 | 1.6 | — | — | 1.3 | — | 0.63 | Bal. |
| 89 | 34.5 | 6.0 | 16.3 | 5.1 | 2.3 | — | — | — | 1.3 | — | 0.52 | Bal. |
| 90 | 34.4 | 6.1 | 15.9 | 5.1 | 4.9 | — | — | — | 1.4 | — | 1.31 | Bal. |
| 91 | 34.5 | 6.2 | 16.0 | 5.1 | — | 1.9 | — | — | 1.3 | — | 0.47 | Bal. |
| 92 | 34.3 | 5.8 | 15.7 | 4.8 | — | 4.6 | — | — | 1.5 | — | 1.25 | Bal. |
| 93 | 34.2 | 5.9 | 15.9 | 5.0 | 0.85 | 1.2 | — | — | 0.13 | — | 0.48 | Bal. |
| 94 | 34.6 | 5.8 | 15.9 | 5.1 | 3.2 | — | — | — | 0.12 | — | 0.64 | Bal. |
| 95 | 34.7 | 6.0 | 16.1 | 4.8 | — | 3.0 | — | — | 0.58 | — | 0.61 | Bal. |
| 96 | 34.4 | 6.2 | 16.0 | 4.7 | 1.7 | 1.4 | — | — | 0.60 | — | 0.63 | Bal. |
| 97 | 34.2 | 6.1 | 16.2 | 4.8 | 3.3 | — | — | — | 1.9 | — | 0.65 | Bal. |
| COM-6 | 21.3 | 12.9 | 24.6 | Cr: 23.5 | — | — | — | — | — | — | — | Bal. |
| 98 | 25.1 | 6.0 | 15.6 | 5.1 | 0.9 | 2.0 | — | — | — | 0.06 | — | Bal. |
| 99 | 30.3 | 5.9 | 16.2 | 5.2 | — | 3.4 | — | — | — | 0.07 | — | Bal. |
| 100 | 34.6 | 5.7 | 16.1 | 5.0 | 3.1 | — | — | — | — | 0.06 | — | Bal. |

COM: Comparative
Bal.: Balance

TABLE 14

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 86 | 0.17 | 0.17 | 410 | 2 |
| 87 | 0.18 | 0.19 | 419 | 2 |
| 88 | 0.20 | 0.20 | 423 | 3 |
| 89 | 0.19 | 0.19 | 419 | 3 |
| 90 | 0.24 | 0.24 | 416 | 1 |
| 91 | 0.18 | 0.20 | 420 | 3 |
| 92 | 0.23 | 0.24 | 417 | 2 |
| 93 | 0.18 | 0.18 | 419 | 2 |
| 94 | 0.18 | 0.20 | 418 | 2 |
| 95 | 0.19 | 0.19 | 420 | 2 |
| 96 | 0.20 | 0.20 | 419 | 2 |
| 97 | 0.20 | 0.19 | 419 | 1 |
| COM-6 | 0.09 | 0.07 | 358 | 19 |
| 98 | 0.19 | 0.19 | 383 | 2 |
| 99 | 0.18 | 0.18 | 402 | 2 |
| 100 | 0.19 | 0.2 | 410 | 2 |

COM: Comparative

TABLE 15

| Sample No. | Component Composition (wt %) | | | | | | | | | | | |
|---|---|---|---|---|---|---|---|---|---|---|---|---|
| | Zr | Ti | Mn | V | Rare Earth Elements | | | | | H | O | Ni + impurity |
| | | | | | La | Ce | Pr | Nd | Hf | | | |
| 101 | 36.8 | 5.2 | 15.7 | 4.9 | 1.5 | 1.6 | — | — | — | 0.07 | — | Bal. |
| 102 | 40.1 | 6.0 | 16.1 | 5.0 | 3.0 | — | — | — | — | 0.06 | — | Bal. |
| 103 | 44.8 | 5.7 | 15.6 | 4.9 | 2.0 | 0.9 | — | — | — | 0.06 | — | Bal. |
| 104 | 35.0 | 1.1 | 15.7 | 5.1 | 1.5 | 1.6 | — | — | — | 0.07 | — | Bal. |
| 105 | 34.9 | 4.2 | 16.0 | 4.9 | — | 3.4 | — | — | — | 0.07 | — | Bal. |
| 106 | 34.3 | 10.2 | 16.1 | 5.2 | 3.0 | — | — | — | — | 0.07 | — | Bal. |
| 107 | 34.8 | 11.9 | 15.6 | 5.0 | 2.0 | 0.9 | — | — | — | 0.06 | — | Bal. |
| 108 | 34.3 | 6.0 | 10.3 | 5.3 | 2.9 | — | — | — | — | 0.06 | — | Bal. |
| 109 | 34.4 | 5.9 | 17.3 | 4.9 | — | 3.2 | — | — | — | 0.07 | — | Bal. |
| 110 | 34.5 | 6.2 | 19.6 | 5.0 | — | 3.6 | — | — | — | 0.07 | — | Bal. |
| 111 | 34.6 | 5.9 | 15.6 | 2.0 | 1.6 | 1.5 | — | — | — | 0.07 | — | Bal. |
| 112 | 34.8 | 6.0 | 15.7 | 2.9 | 1.6 | 1.2 | — | — | — | 0.06 | — | Bal. |
| 113 | 34.9 | 6.0 | 15.8 | 7.9 | 2.9 | — | — | — | — | 0.06 | — | Bal. |
| 114 | 34.3 | 5.7 | 16.0 | 11.8 | — | 3.0 | — | — | — | 0.06 | — | Bal. |
| 115 | 34.1 | 6.2 | 16.4 | 5.1 | 0.53 | — | — | — | — | 0.02 | — | Bal. |

Bal.: Balance

TABLE 16

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 101 | 0.2 | 0.2 | 411 | 2 |
| 102 | 0.2 | 0.21 | 411 | 2 |
| 103 | 0.21 | 0.2 | 402 | 2 |
| 104 | 0.21 | 0.2 | 394 | 2 |
| 105 | 0.2 | 0.21 | 407 | 2 |
| 106 | 0.2 | 0.2 | 403 | 2 |
| 107 | 0.18 | 0.19 | 394 | 2 |
| 108 | 0.19 | 0.19 | 401 | 2 |
| 109 | 0.19 | 0.2 | 408 | 2 |
| 110 | 0.2 | 0.19 | 400 | 2 |
| 111 | 0.18 | 0.19 | 394 | 2 |
| 112 | 0.19 | 0.18 | 402 | 2 |
| 113 | 0.19 | 0.2 | 414 | 2 |
| 114 | 0.18 | 0.19 | 395 | 2 |
| 115 | 0.17 | 0.16 | 415 | 5 |

TABLE 17

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 116 | 34.7 | 6.0 | 15.9 | 5.2 | — | 0.54 | — | — | — | 0.02 | — | Bal. |
| 117 | 34.7 | 6.1 | 16.1 | 4.9 | 2.1 | — | — | — | — | 0.05 | — | Bal. |
| 118 | 34.5 | 6.1 | 16.2 | 5.0 | — | 4.8 | — | — | — | 0.09 | — | Bal. |
| 119 | 34.7 | 6.0 | 15.6 | 5.2 | 2.3 | 2.5 | — | — | — | 0.09 | — | Bal. |
| COM-7 | 23.8 | 12.5 | 24.1 | Cr: 22.9 | 3.8 | — | — | — | — | — | — | Bal. |
| 120 | 25.1 | 6.0 | 15.9 | 5.0 | — | 3.0 | — | — | 1.4 | 0.075 | — | Bal. |
| 121 | 30.1 | 6.1 | 15.6 | 5.0 | 1.7 | 1.6 | — | — | 1.5 | 0.076 | — | Bal. |
| 122 | 34.5 | 6.2 | 15.8 | 5.0 | 3.3 | — | — | — | 1.5 | 0.077 | — | Bal. |
| 123 | 36.9 | 5.1 | 16.1 | 4.9 | 1.2 | 2.4 | — | — | 1.3 | 0.081 | — | Bal. |
| 124 | 40.2 | 6.0 | 15.9 | 5.1 | 1.5 | 1.9 | — | — | 1.5 | 0.080 | — | Bal. |
| 125 | 44.9 | 5.1 | 15.6 | 4.9 | 3.0 | — | — | — | 1.3 | 0.075 | — | Bal. |
| 126 | 34.4 | 1.1 | 15.8 | 5.1 | 1.7 | 1.6 | — | — | 1.5 | 0.076 | — | Bal. |
| 127 | 34.6 | 3.9 | 15.9 | 5.1 | — | 3.0 | — | — | 1.4 | 0.075 | — | Bal. |
| 128 | 34.3 | 9.9 | 15.9 | 5.2 | 3.0 | — | — | — | 1.4 | 0.075 | — | Bal. |
| 129 | 34.5 | 11.8 | 16.1 | 4.9 | 1.2 | 2.4 | — | — | 1.3 | 0.081 | — | Bal. |

COM: Comparative
Bal.: Balance

TABLE 18

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 116 | 0.17 | 0.18 | 417 | 5 |
| 117 | 0.19 | 0.19 | 412 | 2 |
| 118 | 0.2 | 0.21 | 407 | 2 |
| 119 | 0.21 | 0.21 | 408 | 2 |
| COM-7 | 0.07 | 0.07 | 349 | 18 |
| 120 | 0.18 | 0.17 | 386 | 2 |
| 121 | 0.17 | 0.18 | 406 | 2 |
| 122 | 0.19 | 0.19 | 415 | 2 |
| 123 | 0.20 | 0.19 | 414 | 2 |
| 124 | 0.20 | 0.20 | 415 | 2 |
| 125 | 0.19 | 0.20 | 405 | 2 |
| 126 | 0.20 | 0.19 | 398 | 2 |
| 127 | 0.19 | 0.20 | 412 | 2 |
| 128 | 0.20 | 0.20 | 409 | 2 |
| 129 | 0.21 | 0.20 | 397 | 2 |

COM: Comparative

TABLE 19

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 130 | 34.3 | 5.8 | 10.2 | 5.1 | 3.4 | — | — | — | 1.3 | 0.079 | — | Bal. |
| 131 | 34.4 | 6.1 | 19.3 | 4.8 | 1.5 | 1.9 | — | — | 1.5 | 0.080 | — | Bal. |

TABLE 19-continued

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 132 | 34.6 | 5.9 | 16.2 | 2.3 | — | 3.0 | — | — | 1.4 | 0.075 | — | Bal. |
| 133 | 34.2 | 5.8 | 15.9 | 8.6 | 2.9 | — | — | — | 1.4 | 0.074 | — | Bal. |
| 134 | 34.4 | 6.0 | 15.8 | 11.6 | 1.7 | 1.6 | — | — | 1.3 | 0.078 | — | Bal. |
| 135 | 34.1 | 5.8 | 15.8 | 5.0 | 0.53 | — | — | — | 1.2 | 0.045 | — | Bal. |
| 136 | 34.6 | 6.0 | 15.9 | 5.2 | 1.9 | — | — | — | 1.4 | 0.062 | — | Bal. |
| 137 | 34.4 | 5.8 | 16.3 | 5.1 | 4.4 | — | — | — | 1.5 | 0.126 | — | Bal. |
| 138 | 34.3 | 6.2 | 15.9 | 4.8 | — | 0.52 | — | — | 1.3 | 0.045 | — | Bal. |
| 139 | 34.2 | 6.3 | 15.6 | 4.9 | — | 1.5 | — | — | 1.4 | 0.057 | — | Bal. |
| 140 | 34.7 | 5.9 | 16.3 | 5.2 | — | 4.6 | — | — | 1.3 | 0.127 | — | Bal. |
| 141 | 34.3 | 6.2 | 16.2 | 5.1 | 1.0 | 1.0 | — | — | 0.12 | 0.063 | — | Bal. |
| 142 | 34.4 | 5.8 | 16.1 | 5.0 | 3.1 | — | — | — | 0.12 | 0.076 | — | Bal. |
| 143 | 34.4 | 6.1 | 15.9 | 5.1 | — | 2.8 | — | — | 0.62 | 0.072 | — | Bal. |
| 144 | 34.6 | 5.9 | 16.0 | 4.9 | 1.7 | 1.3 | — | — | 0.59 | 0.075 | — | Bal. |

Bal.: Balance

TABLE 20

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 130 | 0.19 | 0.18 | 403 | 2 |
| 131 | 0.18 | 0.19 | 405 | 2 |
| 132 | 0.16 | 0.16 | 401 | 2 |
| 133 | 0.17 | 0.18 | 416 | 2 |
| 134 | 0.19 | 0.20 | 401 | 2 |
| 135 | 0.18 | 0.19 | 419 | 5 |
| 136 | 0.19 | 0.18 | 418 | 3 |
| 137 | 0.22 | 0.23 | 412 | 2 |
| 138 | 0.18 | 0.19 | 419 | 5 |
| 139 | 0.19 | 0.18 | 418 | 3 |
| 140 | 0.23 | 0.22 | 412 | 2 |
| 141 | 0.18 | 0.18 | 413 | 2 |
| 142 | 0.19 | 0.19 | 411 | 2 |
| 143 | 0.19 | 0.20 | 414 | 2 |
| 144 | 0.18 | 0.18 | 413 | 2 |

TABLE 22

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 145 | 0.19 | 0.20 | 414 | 2 |
| 146 | 0.21 | 0.20 | 415 | 2 |
| 147 | 0.20 | 0.20 | 412 | 2 |
| 148 | 0.17 | 0.18 | 419 | 5 |
| 149 | 0.18 | 0.18 | 420 | 5 |
| 150 | 0.19 | 0.18 | 420 | 5 |
| 151 | 0.20 | 0.18 | 418 | 3 |
| 152 | 0.18 | 0.18 | 418 | 4 |
| 153 | 0.18 | 0.18 | 419 | 3 |
| 154 | 0.20 | 0.18 | 416 | 2 |
| 155 | 0.18 | 0.20 | 417 | 2 |
| 156 | 0.19 | 0.20 | 417 | 2 |
| 157 | 0.24 | 0.23 | 411 | 2 |
| 158 | 0.23 | 0.22 | 411 | 2 |
| 159 | 0.24 | 0.23 | 412 | 2 |

TABLE 21

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 145 | 34.2 | 6.0 | 15.8 | 4.8 | 3.2 | — | — | — | 1.8 | 0.077 | — | Bal. |
| 146 | 34.0 | 5.9 | 15.8 | 5.1 | 1.7 | 1.3 | — | — | 2.6 | 0.075 | — | Bal. |
| 147 | 35.0 | 6.1 | 15.7 | 4.9 | 1.7 | 1.2 | — | — | 3.9 | 0.074 | — | Bal. |
| 148 | 34.6 | 6.0 | 16.0 | 4.8 | 0.13 | 0.26 | 0.03 | 0.09 | 1.0 | 0.046 | — | Bal. |
| 149 | 34.7 | 6.0 | 16.1 | 5.1 | 0.21 | 0.18 | 0.13 | — | 0.9 | 0.046 | — | Bal. |
| 150 | 34.3 | 6.1 | 15.8 | 5.2 | 0.28 | — | — | 0.23 | 1.1 | 0.046 | — | Bal. |
| 151 | 34.7 | 5.9 | 16.2 | 4.9 | 0.54 | 0.06 | 0.12 | 0.48 | 1.2 | 0.054 | — | Bal. |
| 152 | 34.7 | 5.9 | 16.0 | 4.9 | 0.32 | 0.23 | — | 0.36 | 0.9 | 0.050 | — | Bal. |
| 153 | 34.4 | 6.0 | 16.0 | 5.0 | 0.64 | — | — | 0.52 | 1.2 | 0.053 | — | Bal. |
| 154 | 34.3 | 6.0 | 16.2 | 5.0 | 1.30 | 0.15 | 0.48 | 0.15 | 1.1 | 0.065 | — | Bal. |
| 155 | 34.6 | 5.9 | 16.2 | 5.3 | 0.54 | — | 0.86 | 0.75 | 1.1 | 0.065 | — | Bal. |
| 156 | 34.4 | 5.9 | 16.0 | 5.1 | — | 1.70 | 0.57 | — | 1.2 | 0.066 | — | Bal. |
| 157 | 34.7 | 5.8 | 16.2 | 5.1 | 3.70 | 0.09 | 0.23 | 0.46 | 0.9 | 0.093 | — | Bal. |
| 158 | 34.5 | 5.9 | 16.2 | 5.1 | — | 1.9 | 1.7 | 1.2 | 1.1 | 0.096 | — | Bal. |
| 159 | 34.3 | 6.1 | 16.1 | 5.2 | — | 2.5 | — | 2.0 | 0.9 | 0.093 | — | Bal. |

Bal.: Balance

TABLE 23

| | Component Composition (wt %) | | | | | | | | | | | |
|---|---|---|---|---|---|---|---|---|---|---|---|---|
| | | | | | | Rare Earth Elements | | | | | | Ni + |
| Sample No. | Zr | Ti | Mn | V | La | Ce | Pr | Nd | Hf | H | O | impurity |
| COM-8 | 23.8 | 12.5 | 24.1 | Cr: 22.9 | 3.8 | — | — | — | — | — | — | Bal. |
| 160 | 25.1 | 6.0 | 16.1 | 5.3 | 3.1 | — | — | — | — | 0.085 | 1.15 | Bal. |
| 161 | 30.8 | 6.1 | 15.9 | 5.3 | — | 3.3 | — | — | — | 0.087 | 1.15 | Bal. |
| 162 | 34.5 | 6.1 | 16.1 | 5.0 | 3 | — | — | — | — | 0.085 | 1.09 | Bal. |
| 163 | 36.9 | 5.3 | 16.3 | 4.8 | 1.6 | 1.4 | — | — | — | 0.082 | 1.12 | Bal. |
| 164 | 40.2 | 5.9 | 16.0 | 4.9 | — | 3 | — | — | — | 0.085 | 1.10 | Bal. |
| 165 | 44.7 | 5.3 | 15.9 | 4.8 | 1.9 | 0.8 | — | — | — | 0.082 | 1.09 | Bal. |
| 166 | 35.0 | 1.1 | 15.9 | 5.1 | 1.6 | 1.4 | — | — | — | 0.085 | 1.10 | Bal. |
| 167 | 34.5 | 4.0 | 16.2 | 4.8 | — | 3 | — | — | — | 0.085 | 1.09 | Bal. |
| 168 | 34.2 | 9.8 | 15.8 | 5.1 | 3.1 | — | — | — | — | 0.084 | 1.13 | Bal. |
| 169 | 34.8 | 11.9 | 16.1 | 4.9 | 1.8 | 0.9 | — | — | — | 0.082 | 1.09 | Bal. |
| 170 | 34.2 | 5.9 | 10.4 | 4.9 | 3 | — | — | — | — | 0.082 | 1.03 | Bal. |
| 171 | 34.2 | 5.8 | 15.4 | 5.0 | — | 3.1 | — | — | — | 0.085 | 1.08 | Bal. |
| 172 | 34.1 | 5.9 | 17.3 | 4.9 | — | 3.5 | — | — | — | 0.089 | 1.15 | Bal. |
| 173 | 34.4 | 6.1 | 19.5 | 5.1 | 1.9 | 0.8 | — | — | — | 0.079 | 0.98 | Bal. |

COM: Comparative
Bal.: Balance

TABLE 24

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| COM-8 | 0.07 | 0.07 | 349 | 18 |
| 160 | 0.19 | 0.20 | 382 | 2 |
| 161 | 0.18 | 0.18 | 404 | 2 |
| 162 | 0.20 | 0.19 | 411 | 2 |
| 163 | 0.19 | 0.20 | 411 | 2 |
| 164 | 0.20 | 0.21 | 411 | 2 |
| 165 | 0.21 | 0.21 | 402 | 2 |
| 166 | 0.20 | 0.20 | 394 | 2 |
| 167 | 0.21 | 0.20 | 406 | 2 |
| 168 | 0.20 | 0.21 | 404 | 2 |
| 169 | 0.21 | 0.21 | 394 | 2 |
| 170 | 0.20 | 0.19 | 400 | 2 |
| 171 | 0.19 | 0.19 | 410 | 2 |
| 172 | 0.20 | 0.20 | 407 | 2 |
| 173 | 0.13 | 0.17 | 402 | 2 |

COM: Comparative

TABLE 25

| | Component Composition (wt %) | | | | | | | | | | | |
|---|---|---|---|---|---|---|---|---|---|---|---|---|
| | | | | | | Rare Earth Elements | | | | | | Ni + |
| Sample No. | Zr | Ti | Mn | V | La | Ce | Pr | Nd | Hf | H | O | impurity |
| 174 | 34.5 | 5.9 | 16.1 | 2.0 | 2.9 | — | — | — | — | 0.085 | 1.09 | Bal. |
| 175 | 34.3 | 5.9 | 15.8 | 3.0 | 1.5 | 1.5 | — | — | — | 0.082 | 1.00 | Bal. |
| 176 | 34.3 | 6.0 | 16.0 | 7.8 | — | 3 | — | — | — | 0.087 | 1.10 | Bal. |
| 177 | 34.4 | 6.1 | 15.9 | 11.7 | 1.8 | 0.9 | — | — | — | 0.083 | 1.10 | Bal. |
| 178 | 34.7 | 6.0 | 16.0 | 4.5 | 0.51 | — | — | — | — | 0.015 | 0.35 | Bal. |
| 179 | 34.7 | 5.9 | 15.8 | 2.8 | — | 0.59 | — | — | — | 0.019 | 0.38 | Bal. |
| 180 | 34.8 | 6.1 | 16.1 | 4.9 | 2 | — | — | — | — | 0.062 | 0.75 | Bal. |
| 181 | 34.9 | 5.9 | 15.9 | 5.1 | — | 5 | — | — | — | 0.107 | 1.58 | Bal. |
| 182 | 34.7 | 6.2 | 16.2 | 4.9 | 2.5 | 2.2 | — | — | — | 0.099 | 1.49 | Bal. |
| COM-9 | 23.8 | 12.5 | 24.1 | Cr: 22.9 | 3.8 | — | — | — | — | — | — | Bal. |
| 183 | 25.1 | 5.8 | 15.9 | 5.2 | 1.7 | — | — | — | 1.4 | 0.097 | 1.10 | Bal. |
| 184 | 30.3 | 5.9 | 16.1 | 4.9 | 1.8 | 1.7 | — | — | 1.4 | 0.101 | 1.16 | Bal. |
| 185 | 34.1 | 6.0 | 16.0 | 5.1 | 3.2 | — | — | — | 1.3 | 0.095 | 1.08 | Bal. |
| 186 | 36.7 | 5.2 | 16.2 | 5.0 | 1 | 2.4 | — | — | 1.5 | 0.099 | 1.14 | Bal. |
| 187 | 39.8 | 5.9 | 16.1 | 5.2 | — | 3.4 | — | — | 1.3 | 0.103 | 1.15 | Bal. |

COM: Comparative
Bal.: Balance

TABLE 26

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 174 | 0.21 | 0.20 | 394 | 2 |
| 175 | 0.20 | 0.20 | 401 | 2 |
| 176 | 0.19 | 0.20 | 413 | 2 |
| 177 | 0.21 | 0.20 | 397 | 2 |
| 178 | 0.17 | 0.18 | 414 | 5 |
| 179 | 0.18 | 0.17 | 405 | 5 |
| 180 | 0.19 | 0.18 | 413 | 2 |
| 181 | 0.20 | 0.20 | 408 | 2 |
| 182 | 0.22 | 0.22 | 407 | 2 |
| COM-9 | 0.07 | 0.07 | 349 | 18 |
| 183 | 0.18 | 0.20 | 386 | 2 |
| 184 | 0.18 | 0.19 | 405 | 2 |
| 185 | 0.19 | 0.18 | 415 | 2 |
| 186 | 0.19 | 0.19 | 415 | 2 |
| 187 | 0.18 | 0.19 | 416 | 2 |

COM: Comparative

TABLE 27

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 188 | 44.8 | 4.9 | 14.8 | 4.5 | 1.6 | 1.5 | — | — | 1.2 | 0.091 | 1.05 | Bal. |
| 189 | 34.2 | 1.2 | 16.1 | 5.0 | — | 3.4 | — | — | 1.3 | 0.100 | 1.10 | Bal. |
| 190 | 34.1 | 4.0 | 16.1 | 5.1 | 1.8 | 1.7 | — | — | 1.5 | 0.105 | 1.10 | Bal. |
| 191 | 34.4 | 10.3 | 15.9 | 5.3 | 2.4 | 1 | — | — | 1.4 | 0.102 | 1.10 | Bal. |
| 192 | 34.3 | 12.0 | 15.9 | 5.2 | 3.1 | — | — | — | 1.3 | 0.098 | 1.05 | Bal. |
| 193 | 34.1 | 6.5 | 10.5 | 5.5 | 2.4 | 1 | — | — | 1.2 | 0.102 | 1.04 | Bal. |
| 194 | 34.5 | 5.5 | 14.3 | 4.9 | 3.3 | — | — | — | 1.3 | 0.101 | 1.03 | Bal. |
| 195 | 33.8 | 6.0 | 19.8 | 5.2 | — | 3.2 | — | — | 1.4 | 0.098 | 1.02 | Bal. |
| 196 | 34.7 | 5.6 | 15.7 | 2.2 | 3.2 | — | — | — | 1.4 | 0.099 | 1.11 | Bal. |
| 197 | 33.5 | 6.1 | 16.3 | 8.2 | — | 3.3 | — | — | 1.2 | 0.101 | 1.13 | Bal. |
| 198 | 33.9 | 6.2 | 16.1 | 11.7 | 2.2 | 1.1 | — | — | 1.3 | 0.102 | 1.14 | Bal. |
| 199 | 34.3 | 5.9 | 15.9 | 5.1 | 0.51 | — | — | — | 1.3 | 0.021 | 0.31 | Bal. |
| 200 | 34.6 | 6.0 | 16.2 | 5.0 | 2 | — | — | — | 1.4 | 0.075 | 0.75 | Bal. |
| 201 | 34.2 | 6.1 | 16.1 | 4.9 | 4.5 | — | — | — | 1.5 | 0.169 | 2.27 | Bal. |
| 202 | 34.1 | 6.1 | 16.0 | 4.9 | — | 0.5 | — | — | 1.3 | 0.023 | 0.30 | Bal. |

Bal.: Balance

TABLE 28

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 188 | 0.19 | 0.20 | 403 | 2 |
| 189 | 0.19 | 0.20 | 397 | 2 |
| 190 | 0.20 | 0.20 | 411 | 2 |
| 191 | 0.20 | 0.19 | 407 | 2 |
| 192 | 0.19 | 0.19 | 397 | 2 |
| 193 | 0.19 | 0.18 | 406 | 2 |
| 194 | 0.18 | 0.19 | 414 | 2 |
| 195 | 0.19 | 0.19 | 404 | 2 |
| 196 | 0.16 | 0.11 | 400 | 2 |
| 197 | 0.18 | 0.18 | 415 | 2 |
| 198 | 0.19 | 0.20 | 399 | 2 |
| 199 | 0.18 | 0.18 | 420 | 5 |
| 200 | 0.19 | 0.20 | 417 | 2 |
| 201 | 0.23 | 0.24 | 412 | 2 |
| 202 | 0.18 | 0.18 | 419 | 5 |

TABLE 29

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 203 | 34.8 | 5.9 | 15.9 | 5.0 | — | 1.9 | — | — | 1.4 | 0.073 | 0.73 | Bal. |
| 204 | 34.4 | 6.2 | 15.8 | 5.1 | — | 4.8 | — | — | 1.2 | 0.173 | 2.32 | Bal. |

TABLE 29-continued

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 205 | 34.3 | 5.8 | 16.0 | 5.0 | 0.9 | 1.3 | — | — | 0.11 | 0.078 | 0.81 | Bal. |
| 206 | 34.5 | 6.0 | 16.1 | 4.8 | 3 | — | — | — | 0.12 | 0.092 | 1.03 | Bal. |
| 207 | 34.5 | 6.1 | 16.3 | 4.7 | — | 2.9 | — | — | 0.6 | 0.090 | 0.99 | Bal. |
| 208 | 34.6 | 5.9 | 15.7 | 4.9 | 1.6 | 1.5 | — | — | 0.61 | 0.094 | 1.05 | Bal. |
| 209 | 34.2 | 6.0 | 15.9 | 5.1 | 2.9 | — | — | — | 1.91 | 0.091 | 1.01 | Bal. |
| 210 | 34.3 | 5.9 | 16.2 | 5.0 | — | 3 | — | — | 3.2 | 0.091 | 1.02 | Bal. |
| 211 | 34.6 | 6.1 | 16.0 | 5.1 | 1.3 | 1.1 | — | — | 4 | 0.081 | 0.86 | Bal. |
| 212 | 34.4 | 6.2 | 16.0 | 4.8 | 0.13 | 0.26 | 0.03 | 0.09 | 1.1 | 0.039 | 0.35 | Bal. |
| 213 | 34.3 | 5.8 | 16.1 | 5.2 | 0.21 | 0.18 | 0.13 | — | 1 | 0.039 | 0.34 | Bal. |
| 214 | 34.5 | 6.1 | 15.8 | 5.1 | 0.28 | — | 0.23 | — | 1.2 | 0.039 | 0.34 | Bal. |
| 215 | 34.7 | 6.2 | 15.9 | 4.9 | 0.53 | 0.06 | 0.12 | 0.47 | 1.2 | 0.050 | 0.53 | Bal. |
| 216 | 34.4 | 5.9 | 16.1 | 5.3 | 0.35 | 0.25 | — | 0.4 | 1 | 0.047 | 0.47 | Bal. |
| 217 | 34.6 | 6.1 | 15.8 | 5.1 | 0.58 | — | — | 0.47 | 1.1 | 0.048 | 0.49 | Bal. |

Bal.: Balance

TABLE 30

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 203 | 0.18 | 0.19 | 418 | 3 |
| 204 | 0.22 | 0.24 | 412 | 2 |
| 205 | 0.18 | 0.19 | 413 | 2 |
| 206 | 0.19 | 0.19 | 411 | 2 |
| 207 | 0.18 | 0.20 | 412 | 2 |
| 208 | 0.18 | 0.19 | 413 | 2 |
| 209 | 0.19 | 0.20 | 416 | 2 |
| 210 | 0.19 | 0.19 | 414 | 2 |
| 211 | 0.20 | 0.19 | 413 | 2 |
| 212 | 0.18 | 0.18 | 419 | 5 |
| 213 | 0.17 | 0.18 | 420 | 5 |
| 214 | 0.18 | 0.18 | 420 | 5 |
| 215 | 0.19 | 0.19 | 419 | 3 |
| 216 | 0.19 | 0.19 | 419 | 4 |
| 217 | 0.18 | 0.17 | 419 | 3 |

TABLE 32

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 218 | 0.19 | 0.18 | 416 | 2 |
| 219 | 0.18 | 0.19 | 416 | 2 |
| 220 | 0.19 | 0.19 | 417 | 2 |
| 221 | 0.23 | 0.23 | 411 | 2 |
| 222 | 0.24 | 0.24 | 412 | 2 |
| 223 | 0.23 | 0.23 | 411 | 2 |
| COM-10 | 0.07 | 0.07 | 349 | 18 |
| 224 | 0.18 | 0.18 | 383 | 2 |
| 225 | 0.18 | 0.19 | 399 | 2 |
| 226 | 0.19 | 0.21 | 410 | 2 |
| 227 | 0.21 | 0.20 | 412 | 2 |
| 228 | 0.20 | 0.21 | 411 | 2 |
| 229 | 0.19 | 0.18 | 400 | 2 |

TABLE 31

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 218 | 34.3 | 6.1 | 16.0 | 5.1 | 1.4 | 0.16 | 0.49 | 0.16 | 1.1 | 0.069 | 0.82 | Bal. |
| 219 | 34.7 | 5.9 | 16.0 | 5.0 | 0.56 | — | 0.89 | 0.78 | 1.1 | 0.068 | 0.81 | Bal. |
| 220 | 34.5 | 5.8 | 16.1 | 5.2 | — | 1.6 | 0.56 | — | 1.1 | 0.069 | 0.82 | Bal. |
| 221 | 34.3 | 5.9 | 16.0 | 4.8 | 3.7 | 0.09 | 0.24 | 0.47 | 1 | 0.111 | 1.50 | Bal. |
| 222 | 34.6 | 5.9 | 16.2 | 5.1 | — | 1.9 | 1.6 | 1.1 | 1.1 | 0.112 | 1.51 | Bal. |
| 223 | 34.6 | 6.0 | 16.1 | 4.9 | — | 2.5 | — | 2.1 | 1 | 0.110 | 1.49 | Bal. |
| COM-10 | 23.8 | 12.5 | 24.1 | Cr: 22.9 | 3.8 | — | — | — | — | — | — | Bal. |
| 224 | 25.5 | 6.2 | 16.0 | 4.9 | 1.0 | 2.1 | — | — | — | — | 0.61 | Bal. |
| 225 | 29.2 | 5.8 | 15.9 | 5.0 | — | 3.1 | — | — | — | — | 0.65 | Bal. |
| 226 | 34.7 | 5.9 | 15.8 | 4.8 | 3.3 | — | — | — | — | — | 0.65 | Bal. |
| 227 | 36.7 | 5.4 | 16.1 | 5.1 | 1.4 | 1.7 | — | — | — | — | 0.61 | Bal. |
| 228 | 40.9 | 5.7 | 15.5 | 5.2 | 1.7 | 1.4 | — | — | — | — | 0.62 | Bal. |
| 229 | 44.9 | 6.0 | 15.7 | 4.5 | 2.0 | 1.1 | — | — | — | — | 0.62 | Bal. |
| 230 | 34.8 | 1.2 | 16.1 | 4.8 | — | 3.1 | — | — | — | — | 0.62 | Bal. |
| 231 | 34.5 | 7.5 | 15.7 | 4.6 | 2.1 | 1.0 | — | — | — | — | 0.63 | Bal. |

COM: Comparative
Bal.: Balance

TABLE 32-continued

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 230 | 0.21 | 0.20 | 393 | 2 |
| 231 | 0.20 | 0.20 | 409 | 2 |

COM: Comparative

TABLE 33

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| 232 | 34.7 | 10.8 | 15.9 | 5.2 | 3.0 | — | — | — | — | — | 0.60 | Bal. |
| 233 | 34.7 | 12.0 | 15.8 | 5.0 | 1.6 | 1.5 | — | — | — | — | 0.60 | Bal. |
| 234 | 34.5 | 6.1 | 10.1 | 5.2 | — | 2.7 | — | — | — | — | 0.57 | Bal. |
| 235 | 34.7 | 6.2 | 15.2 | 4.8 | 3.1 | — | — | — | — | — | 0.62 | Bal. |
| 236 | 34.8 | 6.1 | 17.9 | 4.9 | — | 3.5 | — | — | — | — | 0.70 | Bal. |
| 237 | 34.7 | 5.9 | 19.9 | 5.2 | 2.1 | 0.7 | — | — | — | — | 0.59 | Bal. |
| 238 | 34.8 | 6.0 | 15.9 | 2.1 | — | 3.0 | — | — | — | — | 0.62 | Bal. |
| 239 | 34.9 | 6.1 | 15.9 | 2.7 | 1.5 | 1.4 | — | — | — | — | 0.59 | Bal. |
| 240 | 34.7 | 5.7 | 15.5 | 7.5 | 1.4 | 1.7 | — | — | — | — | 0.63 | Bal. |
| 241 | 35.0 | 5.9 | 15.7 | 11.8 | 2.9 | — | — | — | — | — | 0.61 | Bal. |
| 242 | 34.2 | 6.0 | 16.3 | 4.8 | 0.56 | — | — | — | — | — | 0.28 | Bal. |
| 243 | 34.1 | 5.9 | 15.9 | 5.1 | — | 0.59 | — | — | — | — | 0.29 | Bal. |
| 244 | 34.6 | 6.1 | 15.8 | 5.0 | 2.2 | — | — | — | — | — | 0.47 | Bal. |
| 245 | 34.5 | 6.2 | 16.2 | 5.1 | — | 5.0 | — | — | — | — | 0.91 | Bal. |
| 246 | 34.7 | 5.8 | 16.1 | 4.9 | 2.6 | 2.4 | — | — | — | — | 0.85 | Bal. |

Bal.: Balance

TABLE 34

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 232 | 0.19 | 0.20 | 401 | 2 |
| 233 | 0.20 | 0.21 | 393 | 2 |
| 234 | 0.19 | 0.20 | 401 | 2 |
| 235 | 0.19 | 0.20 | 411 | 2 |
| 236 | 0.19 | 0.20 | 406 | 2 |
| 237 | 0.16 | 0.18 | 400 | 2 |
| 238 | 0.19 | 0.20 | 395 | 2 |
| 239 | 0.18 | 0.18 | 400 | 2 |
| 240 | 0.21 | 0.20 | 414 | 2 |
| 241 | 0.20 | 0.20 | 396 | 2 |
| 242 | 0.16 | 0.15 | 414 | 5 |
| 243 | 0.17 | 0.17 | 415 | 5 |
| 244 | 0.19 | 0.19 | 413 | 2 |
| 245 | 0.21 | 0.20 | 407 | 2 |
| 246 | 0.21 | 0.21 | 406 | 2 |

TABLE 35

| | Component Composition (wt %) | | | | | | | | | | | |
|---|---|---|---|---|---|---|---|---|---|---|---|---|
| | | | | | Rare Earth Elements | | | | | | | Ni + |
| Sample No. | Zr | Ti | Mn | V | La | Ce | Pr | Nd | Hf | H | O | impurity |
| COM-11 | 23.8 | 12.5 | 24.1 | Cr: 22.9 | 3.8 | — | — | — | — | — | — | Bal. |
| 247 | 25.4 | 5.5 | 16.5 | 5.2 | — | 3.1 | — | — | 1.2 | — | 0.69 | Bal. |
| 248 | 29.8 | 6.0 | 16.3 | 4.9 | 1.8 | 1.6 | — | — | 1.3 | — | 0.67 | Bal. |
| 249 | 34.2 | 5.9 | 16.2 | 5.0 | 3.3 | — | — | — | 1.4 | — | 0.66 | Bal. |
| 250 | 36.1 | 5.2 | 16.2 | 4.8 | 1.6 | 2.0 | — | — | 1.4 | — | 0.70 | Bal. |
| 251 | 39.9 | 5.4 | 16.4 | 5.1 | — | 3.2 | — | — | 1.3 | — | 0.68 | Bal. |
| 252 | 44.7 | 5.2 | 15.5 | 4.7 | 3.0 | — | — | — | 1.2 | — | 0.65 | Bal. |
| 253 | 34.8 | 1.1 | 16.0 | 4.4 | 1.8 | 1.6 | — | — | 1.4 | — | 0.68 | Bal. |
| 254 | 34.2 | 4.1 | 16.5 | 5.7 | — | 3.0 | — | — | 1.2 | — | 0.66 | Bal. |
| 255 | 34.5 | 10.1 | 16.1 | 4.7 | 3.1 | — | — | — | 1.2 | — | 0.62 | Bal. |
| 256 | 34.7 | 11.8 | 15.7 | 5.1 | 1.6 | 2.1 | — | — | 1.3 | — | 0.67 | Bal. |
| 257 | 34.3 | 6.2 | 10.3 | 5.3 | 3.4 | — | — | — | 1.4 | — | 0.66 | Bal. |
| 258 | 34.5 | 6.0 | 17.6 | 5.1 | — | 3.1 | — | — | 1.3 | — | 0.65 | Bal. |

TABLE 35-continued

| | Component Composition (wt %) | | | | | | | | | | |
|---|---|---|---|---|---|---|---|---|---|---|---|
| | | | | | Rare Earth Elements | | | | | | Ni + |
| Sample No. | Zr | Ti | Mn | V | La | Ce | Pr | Nd | Hf | H | O | impurity |
| 259 | 34.4 | 6.1 | 19.5 | 5.0 | 1.8 | 1.5 | — | — | 1.5 | — | 0.65 | Bal. |
| 260 | 34.5 | 5.8 | 15.9 | 2.1 | — | 3.2 | — | — | 1.4 | — | 0.64 | Bal. |

COM: Comparative
Bal.: Balance

TABLE 36

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| COM-11 | 0.07 | 0.07 | 349 | 18 |
| 247 | 0.20 | 0.19 | 387 | 2 |
| 248 | 0.19 | 0.20 | 404 | 2 |
| 249 | 0.19 | 0.18 | 414 | 2 |
| 250 | 0.20 | 0.20 | 414 | 2 |
| 251 | 0.20 | 0.21 | 415 | 2 |
| 252 | 0.21 | 0.21 | 405 | 2 |
| 253 | 0.18 | 0.19 | 395 | 2 |
| 254 | 0.20 | 0.19 | 412 | 2 |
| 255 | 0.19 | 0.20 | 406 | 2 |
| 256 | 0.20 | 0.20 | 398 | 2 |
| 257 | 0.19 | 0.19 | 405 | 2 |
| 258 | 0.20 | 0.20 | 412 | 2 |
| 259 | 0.19 | 0.19 | 405 | 2 |
| 260 | 0.17 | 0.17 | 399 | 2 |

COM: Comparative

TABLE 38

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 261 | 0.18 | 0.19 | 417 | 2 |
| 262 | 0.20 | 0.20 | 402 | 2 |
| 263 | 0.18 | 0.19 | 421 | 5 |
| 264 | 0.19 | 0.19 | 417 | 2 |
| 265 | 0.24 | 0.24 | 412 | 2 |
| 266 | 0.19 | 0.18 | 419 | 5 |
| 267 | 0.18 | 0.20 | 418 | 3 |
| 268 | 0.23 | 0.24 | 411 | 2 |
| 269 | 0.18 | 0.18 | 413 | 2 |
| 270 | 0.18 | 0.20 | 411 | 2 |
| 271 | 0.19 | 0.19 | 413 | 2 |
| 272 | 0.20 | 0.20 | 412 | 2 |
| 273 | 0.20 | 0.19 | 414 | 2 |
| 274 | 0.20 | 0.21 | 415 | 2 |
| 275 | 0.21 | 0.20 | 409 | 2 |

TABLE 37

| | Component Composition (wt %) | | | | | | | | | | |
|---|---|---|---|---|---|---|---|---|---|---|---|
| | | | | | Rare Earth Elements | | | | | | Ni + |
| Sample No. | Zr | Ti | Mn | V | La | Ce | Pr | Nd | Hf | H | O | impurity |
| 261 | 34.6 | 6.0 | 16.0 | 8.2 | 3.2 | — | — | — | 1.5 | — | 0.64 | Bal. |
| 262 | 34.5 | 6.1 | 15.9 | 11.5 | 1.5 | 1.6 | — | — | 1.3 | — | 0.63 | Bal. |
| 263 | 34.5 | 6.3 | 16.7 | 5.5 | 0.51 | — | — | — | 1.2 | — | 0.60 | Bal. |
| 264 | 34.5 | 6.0 | 16.3 | 5.1 | 2.3 | — | — | — | 1.3 | — | 0.52 | Bal. |
| 265 | 34.4 | 6.1 | 15.9 | 5.1 | 4.9 | — | — | — | 1.4 | — | 1.31 | Bal. |
| 266 | 35.0 | 5.9 | 16.2 | 4.5 | — | 0.5 | — | — | 1.4 | — | 0.61 | Bal. |
| 267 | 34.5 | 6.2 | 16.0 | 5.1 | — | 1.9 | — | — | 1.3 | — | 0.47 | Bal. |
| 268 | 34.3 | 5.8 | 15.7 | 4.8 | — | 4.6 | — | — | 1.5 | — | 1.25 | Bal. |
| 269 | 34.2 | 5.9 | 15.9 | 5.0 | 0.85 | 1.2 | — | — | 0.13 | — | 0.48 | Bal. |
| 270 | 34.6 | 5.8 | 15.9 | 5.1 | 3.2 | — | — | — | 0.12 | — | 0.64 | Bal. |
| 271 | 34.7 | 6.0 | 16.1 | 4.8 | — | 3.0 | — | — | 0.58 | — | 0.61 | Bal. |
| 272 | 34.4 | 6.2 | 16.0 | 4.7 | 1.7 | 1.4 | — | — | 0.6 | — | 0.63 | Bal. |
| 273 | 34.2 | 6.1 | 16.2 | 4.8 | 3.3 | — | — | — | 1.9 | — | 0.65 | Bal. |
| 274 | 34.5 | 5.7 | 15.7 | 5.5 | 1.8 | 1.6 | — | — | 3.2 | — | 0.64 | Bal. |
| 275 | 35.0 | 6.3 | 16.5 | 4.5 | — | 3.3 | — | — | 3.9 | — | 0.64 | Bal. |

Bal.: Balance

TABLE 39

| | Component Composition (wt %) | | | | | | | | | | |
|---|---|---|---|---|---|---|---|---|---|---|---|
| | | | | | Rare Earth Elements | | | | | | Ni + |
| Sample No. | Zr | Ti | Mn | V | La | Ce | Pr | Nd | Hf | H | O | impurity |

| Sample No. | Zr | Ti | Mn | V | La | Ce | Pr | Nd | Hf | H | O | impurity |
|---|---|---|---|---|---|---|---|---|---|---|---|---|
| 276 | 34.7 | 5.9 | 16.0 | 5.1 | 0.13 | 0.26 | 0.03 | 0.09 | 0.9 | — | 0.27 | Bal. |
| 277 | 34.6 | 5.8 | 16.0 | 4.8 | 0.21 | 0.18 | 0.13 | — | 1.1 | — | 0.27 | Bal. |
| 278 | 34.3 | 6.1 | 15.8 | 5.0 | 0.28 | — | 0.23 | — | 1.0 | — | 0.27 | Bal. |
| 279 | 34.2 | 6.1 | 16.1 | 5.1 | 0.45 | 0.05 | 0.10 | 0.40 | 1.0 | — | 0.34 | Bal. |
| 280 | 34.7 | 6.1 | 15.9 | 5.2 | 0.32 | 0.23 | — | 0.30 | 0.9 | — | 0.33 | Bal. |
| 281 | 34.2 | 5.9 | 16.2 | 5.0 | 0.60 | — | — | 0.49 | 1.1 | — | 0.35 | Bal. |
| 282 | 34.4 | 6.0 | 15.9 | 5.1 | 1.30 | 0.15 | 0.48 | 0.15 | 1.1 | — | 0.50 | Bal. |
| 283 | 34.6 | 5.9 | 16.0 | 5.0 | 0.50 | — | 0.81 | 0.70 | 0.9 | — | 0.48 | Bal. |
| 284 | 34.4 | 5.9 | 16.0 | 4.9 | — | 1.6 | 0.54 | — | 1.1 | — | 0.50 | Bal. |
| 285 | 34.6 | 5.8 | 16.0 | 5.1 | 3.7 | 0.09 | 0.23 | 0.47 | 1.0 | — | 0.85 | Bal. |
| 286 | 34.3 | 6.1 | 15.8 | 4.9 | — | 1.9 | 1.7 | 1.2 | 1.1 | — | 0.87 | Bal. |
| 287 | 34.6 | 5.9 | 15.8 | 5.1 | — | 2.6 | — | 2.1 | 1.0 | — | 0.85 | Bal. |
| COM-12 | 23.8 | 12.5 | 24.1 | Cr: 22.9 | 3.8 | — | — | — | — | — | — | Bal. |

COM: Comparative
Bal.: Balance

TABLE 40

| Sample No. | Hydrogen Absorption Speed (wt %/SEC) | Hydrogen Discharge Speed (wt %/SEC) | Electric Discharge Capacity (mAh/g) | Electric Charge and Discharge Cycles (time) |
|---|---|---|---|---|
| 276 | 0.19 | 0.17 | 420 | 5 |
| 277 | 0.18 | 0.17 | 419 | 5 |
| 278 | 0.18 | 0.17 | 419 | 5 |
| 279 | 0.17 | 0.19 | 418 | 4 |
| 280 | 0.18 | 0.18 | 420 | 4 |
| 281 | 0.18 | 0.18 | 418 | 3 |
| 282 | 0.19 | 0.19 | 417 | 2 |
| 283 | 0.20 | 0.19 | 416 | 2 |
| 284 | 0.21 | 0.21 | 416 | 2 |
| 285 | 0.23 | 0.22 | 412 | 2 |
| 286 | 0.22 | 0.24 | 411 | 2 |
| 287 | 0.24 | 0.23 | 412 | 2 |
| COM-12 | 0.07 | 0.07 | 349 | 18 |

COM: Comparative

We claim:

1. A hydrogen occluding alloy having a composition comprising, by wt %:
   25 to 45% of Zr 1 to 12% of Ti
   10 to 20% of Mn 2 to 12% of V
   0.5% to 5% of at least one rare earth element, unavoidable impurities,
   and at least 25% of Ni,
   said alloy having a structure comprising a matrix phase made of Zr—Ni—Mn based alloy, and a dispersed hydrogen-containing phase distributed in said matrix phase, said structure having cracks, said dispersed phase having been formed by exposing surfaces of said cracks to a hydrogen-containing substance.

2. A hydrogen occluding alloy as recited in claim 1, wherein said dispersed phase comprises hydride of rare earth element and rare earth-Ni based alloy.

3. A hydrogen occluding alloy as recited in claim 1, wherein said dispersed phase comprises hydroxide of rare earth element and rare earth-Ni based alloy.

4. A hydrogen occluding alloy as recited in claim 1, wherein said dispersed phase comprises oxide of rare earth element and rare earth-Ni based alloy.

5. A hydrogen occluding alloy as recited in claim 1, wherein said composition comprises, by wt %:
   25 to 40% of Zr, 4 to 12% of Ti,
   10 to 20% of Mn, 2 to 8% of V,
   0.5 to 5% of at least one rare earth element,
   unavoidable impurities, and at least 25% of Ni.

6. A hydrogen occluding alloy as recited in claim 5, wherein said dispersed phase comprises a hydride of a rare earth element and a rare earth element-Ni alloy.

7. A hydrogen occluding alloy as recited in claim 5, wherein said dispersed phase comprises a hydroxide of a rare earth element and a rare earth element-Ni alloy.

8. A hydrogen occluding alloy as recited in claim 5, wherein said dispersed phase comprises rare earth element oxide and a rare earth element-Ni alloy.

9. A hydrogen occluding alloy as recited in claim 1, wherein said composition consists essentially of, by wt %:
   30 to 37% of Zr, 5 to 10% of Ti,
   14 to 18% of Mn, 3 to 6% of V,
   2 to 4% of La and/or Ce,
   unaviodable impurities,
   and at least 25% of Ni.

10. A hydrogen occluding alloy as recited in claim 9, wherein said dispersed phase comprises a hydride of a rare earth element and a rare earth element-Ni alloy.

11. A hydrogen occluding alloy as recited in claim 9, wherein said dispersed phase comprises a hydroxide of a rare earth element and a rare earth element-Ni alloy.

12. A hydrogen occluding alloy as recited in claim 9, wherein said dispersed phase comprises rare earth element oxide and a rare earth element-Ni alloy.

13. An electrode for a Ni-hydrogen battery, said electrode comprising an alloy as recited in claim 1.

14. A hydrogen occluding alloy as recited in claim 1, wherein said composition further comprises 0.1–4.0 weight percent of Hf.

15. A hydrogen occluding alloy as recited in claim 5, wherein said composition further comprises 0.1–2.0 weight percent of Hf.

16. A hydrogen occluding alloy as recited in claim 6, wherein said composition further comprises 0.1–2.0 weight percent of Hf.

17. A hydrogen occluding alloy as recited in claim 7, wherein said composition further comprises 0.1–2.0 weight percent of Hf.

18. A hydrogen occluding alloy as recited in claim 8, wherein said composition further comprises 0.1–2.0 weight percent of Hf.

19. A hydrogen occluding alloy as recited in claim 9, wherein said composition further comprises 1.0–1.7 weight percent of Hf.

20. A hydrogen occluding alloy as recited in claim 10, wherein said composition further comprises 1.0–1.7 weight percent of Hf.

21. A hydrogen occluding alloy as recited in claim 11, wherein said composition further comprises 1.0–1.7 weight percent of Hf.

22. A hydrogen occluding alloy as recited in claim 12, wherein said composition further comprises 1.0–1.7 weight percent of Hf.

23. A hydrogen occluding alloy formed according to a process comprising:

(a) preparing an alloy ingot having a composition comprising, by weight:
   25 to 45% of Zr, 1 to 12% of Ti,
   10 to 20% of Mn, 2 to 12% of V,
   0.5% to 5% of at least one rare earth element,
   unavoidable impurities, and at least 25% of Ni, (b) homogenizing said ingot in a non-oxidizing atmosphere, (c) heat treating said ingot in a hydrogen atmosphere at a temperature in the range of from 400° C. to 900° C.

24. A hydrogen occluding alloy as recited in claim 23, wherein said process further comprises (d) immersing said ingot in an alkaline aqueous solution.

25. A hydrogen occluding alloy as recited in claim 23, wherein said process further comprises (d) heat treating said ingot in an oxidizing atmosphere.

* * * * *